(12) United States Patent
Xi et al.

(10) Patent No.: US 12,554,466 B2
(45) Date of Patent: Feb. 17, 2026

(54) SYSTEMS AND METHODS FOR ACCELERATING THE COMPUTATION OF THE EXPONENTIAL FUNCTION

(71) Applicant: Microsoft Technology Licensing, LLC, Redmond, WA (US)

(72) Inventors: Jinwen Xi, Sunnyvale, CA (US); Ritchie Zhao, Redmond, WA (US); Ming Gang Liu, Kirkland, WA (US); Eric S. Chung, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 947 days.

(21) Appl. No.: 17/487,600

(22) Filed: Sep. 28, 2021

(65) Prior Publication Data

US 2023/0106651 A1 Apr. 6, 2023

(51) Int. Cl.
*G06F 7/556* (2006.01)
*G06F 7/483* (2006.01)

(52) U.S. Cl.
CPC .............. *G06F 7/556* (2013.01); *G06F 7/483* (2013.01)

(58) Field of Classification Search
CPC ................................ G06F 7/556; G06F 7/483
See application file for complete search history.

(56) References Cited

U.S. PATENT DOCUMENTS

| | | | | |
|---|---|---|---|---|
| 5,359,551 A * | 10/1994 | Pickett | ................... | G06F 17/17 708/270 |
| 9,552,189 B1 * | 1/2017 | Langhammer | .......... | G06F 7/556 |
| 10,713,013 B1 * | 7/2020 | Old | ......................... | G06F 7/556 |
| 2010/0198894 A1 * | 8/2010 | Azadet | .................... | G06F 1/035 708/620 |
| 2013/0054665 A1 * | 2/2013 | Felch | ...................... | G06F 7/552 708/517 |
| 2016/0124709 A1 | 5/2016 | Bekas et al. | | |

(Continued)

OTHER PUBLICATIONS

Woodie, A. "Graphcore promises AI-Speedup with 'Intelligent Processing Unit'." HPCwire. Nov. 2, 2016. https://www.hpcwire.com/2016/11/01/graphcore-100x-speedup-pcie-plugin/ (Year: 2016).*

(Continued)

*Primary Examiner* — Andrew Caldwell
*Assistant Examiner* — Markus A Villanueva

(57) ABSTRACT

Aspects of embodiments of the present disclosure relate to a field programmable gate array (FPGA) configured to implement an exponential function data path including: an input scaling stage including constant shifters and integer adders to scale a mantissa portion of an input floating-point value by approximately $\log_2 e$ to compute a scaled mantissa value, where e is Euler's number; and an exponential stage including barrel shifters and an exponential lookup table to: extract an integer portion and a fractional portion from the scaled mantissa value based on the exponent portion of the input floating-point value; apply a bias shift to the integer portion to compute a result exponent portion of a result floating-point value; lookup a result mantissa portion of the result floating-point value in the exponential lookup table based on the fractional portion; and combine the result exponent portion and the result mantissa portion to generate the result floating-point value.

18 Claims, 11 Drawing Sheets

(56) References Cited

U.S. PATENT DOCUMENTS

| | | | |
|---|---|---|---|
| 2019/0042922 A1* | 2/2019 | Pillai | G06F 7/49957 |
| 2020/0293315 A1* | 9/2020 | Mangnall | G06F 9/30014 |
| 2021/0019116 A1* | 1/2021 | Sun | G06F 7/523 |
| 2022/0057995 A1* | 2/2022 | Cappello | G06F 7/57 |
| 2022/0237414 A1* | 7/2022 | Zhang | A01M 21/00 |

OTHER PUBLICATIONS

Baumann, C. "A simple and fast look-up table method to compute the exp(x) and ln(x) functions." Convict Episcopal de Luxembourg. Jul. 29, 2004. https://www.convict.lu/Jeunes/ultimate_stuff/exp_ln_2.htm (Year: 2004).*

Xavier, J. "RTL Design and Analysis of Softmax Layer in Deep Neural Networks." Report Presented to the Faculty of the Graduate School of The University of Texas at Austin. The University of Texas at Austin. May 2020. (Year: 2020).*

M. Wang, S. Lu, D. Zhu, J. Lin and Z. Wang, "A High-Speed and Low-Complexity Architecture for Softmax Function in Deep Learning," 2018 IEEE Asia Pacific Conference on Circuits and Systems (APCCAS), Chengdu, China, 2018, pp. 223-226, doi: 10.1109/APCCAS.2018.8605654. (Year: 2018).*

Neil Weste and David Harris. 2010. CMOS VLSI Design: A Circuits and Systems Perspective (4th. ed.). Addison-Wesley Publishing Company, USA. (Year: 2010).*

Langhammer, et al., "Faithful Single-Precision Floating-Point Tangent for FPGAs", In Proceedings of the ACM/SIGDA international symposium on Field programmable gate arrays, Feb. 11, 2013, pp. 39-42.

Pineiro, et al., "High-speed function approximation using a minimax quadratic interpolator", In Journal of IEEE Transactions on Computers, vol. 54, Issue 3, Mar. 2005, pp. 304-318.

Cardarilli, et al., "A Pseudo-Softmax Function for Hardware-Based High Speed Image Classifcation", In Journal of Scientific reports, vol. 11, Issue 1, Jul. 28, 2021, 10 Pages.

Dinechin, et al., "Floating-point exponential functions for DSP-enabled FPGAs", In Proceedings of International Conference on Field-Programmable Technology, Dec. 8, 2010, pp. 110-117.

"International Search Report and Written Opinion Issued in PCT Application No. PCT/US22/039228", Mailed Date: Nov. 17, 2022, 13 Pages.

* cited by examiner

SYSTEMS AND METHODS FOR ACCELERATING THE COMPUTATION OF THE EXPONENTIAL FUNCTION

BACKGROUND

A field programmable gate array (FPGA) is a hardware device that includes an array of logic blocks and reconfigurable interconnects between those logic blocks. In Intel® (or, formerly, Altera®) products, these logic blocks may be referred to as Adaptive Logic Modules (ALMs) and in Xilinx® products, these may be referred to as Configurable Logic Blocks (CLBs). Each logic block may include programmable logic, such as one or more look up tables (LUTs) for performing configurable logical mappings from inputs to outputs, an adder for adding input values, a register for temporarily holding data, and the like. Programming or configuring an FPGA with a configuration file sets the interconnects (or interconnect "fabric") to wire together the different logic blocks, thereby configuring the FPGA to perform the particular function specified by the configuration file (sometimes referred to as a "bit file").

Compared to software implementations executed by a general purpose processor, an FPGA brings the benefits of higher performance and lower power consumption of implementing computations at a low level (e.g., at a circuit level). This is similar to the benefits of using an application specific integrated circuit (ASIC) such as specialized co-processors such as a graphics processing unit (GPU) or neural accelerator, which are used to accelerate operations specific to computer graphics and artificial neural networks, respectively. However, the design and fabrication of ASICs is a long, expensive process with high upfront fixed costs.

Accordingly, some applications of FPGAs include, for example, prototyping for hardware design that may eventually be implemented in an ASIC as well as hardware acceleration of computations in circumstances where designing and fabricating an ASIC may not be justified (e.g., due to low quantities or high specialization of the computations). In addition, FPGAs also flexibility of reconfiguration of the underlying hardware (in the "field") without being locked into a fixed hardware configuration, as in the case of ASIC, where the logic is directly implemented in the layout of a circuit at the time of fabrication and therefore has little to no reconfigurability. Some cloud computing providers provide access to hardware instances (e.g., servers) that include connected FPGAs, thereby allowing users to customize the FPGA to perform hardware acceleration of computational operations.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of embodiments of the present disclosure relate to systems and methods for accelerating the computation of the exponential function using hardware such as a field programmable gate array (FPGA). Some specific embodiments of the present disclosure relate accelerating the computation of the exponential function on low-precision floating-point numbers (e.g., 16-bit floating-point numbers in floating-point formats such as BFloat16, IEEE half-precision 16-bit float FP16, or the like), although embodiments of the present disclosure are not limited thereto. In more detail, in some embodiments of the present disclosure, a computationally-efficient approximation of the exponential function is performed on the input, where the difference between the approximation and the actual exponential function is sufficiently small for the particular use case of the approximation (e.g., sufficiently small to result in similar model convergence properties when the approximation is used in the training of a machine learning model such as a deep neural network). Experiments on training neural networks using embodiments of the present disclosure show substantially the same training characteristics (e.g., convergence of the training model and accuracy) as a neural network trained using a comparative ground-truth implementation of an exponential function.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
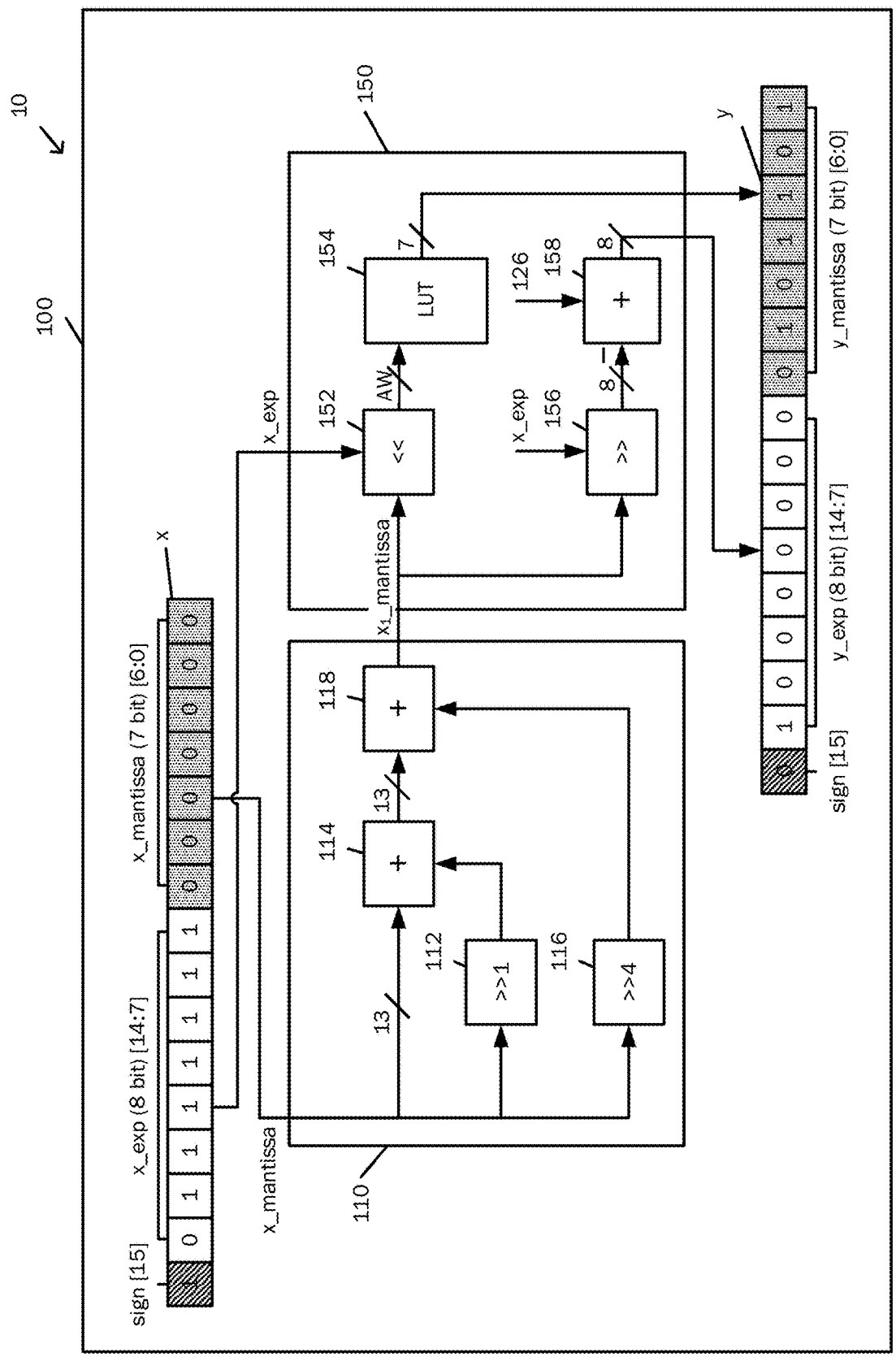
FIG. 1 is a schematic block diagram of a portion of a field programmable gate array (FPGA) configured to compute an approximation of the exponential function according to one embodiment of the present disclosure.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

Aspects of embodiments of the present disclosure relate to systems and methods for accelerating the computation of machine learning models using hardware such as a field programmable gate array (FPGA). One use case for FPGAs is the acceleration of computations that are associated with machine leaning tasks such as computer vision (e.g., image classification, instance segmentation, and the like), natural language processing (e.g., transformer models), and the like. Training a machine learning model, such as a deep neural network (DNN) may typically takes hours for a small model and may take weeks or months of computing time for large models. Moving computationally expensive operations from slow, general purpose processor onto FPGAs specifically configured to perform those expensive operations can provide significant reductions in total compute time and reductions in power consumption.

One common operation performed in training machine learning models, especially in neural network models including deep neural networks, is a softmax function or normalized exponential function. The softmax function normalizes a set of K positive or negative values such that each of the values is in the interval from 0 to 1 (e.g., in the interval [0,1]), such that the sum of the K values adds up to 1. For an input set or vector z of K values $z_1, \ldots, z_K$, the softmax σ of a particular value $z_i$ can be expressed as:

$$\sigma(z_i) = \frac{e^{z_i}}{\sum_{j=1}^{K} e^{z_j}}$$

As seen above, computing the softmax of a value requires computing the exponential function $e^x$, where e is Euler's number (e.g., e=2.71828 . . . ).

During the course of training a machine learning model, the softmax function may be computed a massive number of times (e.g., billions or trillions of times, or more, depending on the size and complexity of the model). Furthermore, in many cases computing exponentials makes up a large percentage of all operations performed by a processor. As one example, when training some large machine learning models for natural language processing, the softmax kernel (the computer code that implements softmax) takes 54.43% of the total vector floating-point operations performed by the CPU, and the exponential function claims 16.7% of those CPU operations performed by softmax. Therefore, offloading the softmax operations to a processor that is specifically designed to compute the exponential function (a hardware accelerator) provides significant speed improvements and energy efficiency improvements in these machine learning tasks.

As noted in the background section, field programmable gate arrays (FPGAs) are made up of a large array of logic blocks (e.g., tens of thousands of logic blocks) with reconfigurable interconnects between those blocks, where an FPGA may be programmed or configured to perform particular functions using a developer-defined configuration file or bit file, where the configuration file is the generated output of electronic design automation (EDA) software based on a functional description of the circuit, which may be written in a hardware description language such as Verilog, VHDL, or higher level languages such as SystemC. These basic logic blocks may be referred to as Adaptive Logic Modules (ALMs) in Intel® or Altera® products and may be referred to as Configurable Logic Blocks (CLBs) in Xilinx® products. Each logic block typically includes one or more look up tables (LUTs), a 1-bit adder, and a register for storing data.

One use case for FPGAs is the hardware acceleration of specialized computational tasks, such as the exponential function discussed above. Some examples of comparative approaches to configuring an FPGA to compute such specialized mathematical functions, including exponential, are described in Piñeiro, J-A., et al. "High-speed function approximation using a minimax quadratic interpolator." *IEEE Transactions on Computers* 54.3 (2005): 304-318.

In one comparative data path for computing softmax on low-precision floating-point input tensors (e.g., the BFloat16 16-bit floating-point data format), the data path includes six vector floating-point arithmetic units: reduce-max, subtract, exponential, reduce-add, inverse and multiply. In this comparative architecture, the exponential unit consumes over 50% of the data path and is larger than the sum of all other functional units' resource utilizations. At the top-level of the softmax accelerator, the exponential unit is the largest consumer of FPGA resources, claiming 31% of the total logic blocks available on the FPGA.

One common method of approximating exponential function in hardware is based on the quadratic interpolation introduced by Piñeiro et al., cited above. In particular, based on basic mathematical definitions, the exponential function exp(x), or $e^x$, may be re-written as:

$$\exp(x) = e^x = 2^{(\log_2 e) \cdot x}$$

Noting that $\log_2 e \approx 1.4427$, the exponential function $e^x$ may approximated as:

$$\exp(x) = e^x = 2^{1.4427*x}$$

In the comparative implementation used in Piñeiro et al., the $2^x$ operation (which may also be denoted herein as $\exp_2(x)$) is approximated by quadratic interpolation with three integer multiplications and two additions. therefore, this comparative technique in Piñeiro et al. instantiates one floating-point multiplier, three integer multipliers, and two integer adders. Implementing these multipliers and adders is very resource-intensive in the FPGAs without hard DSP (digital signal processing) macros for implementing these multipliers (e.g., fixed and dedicated circuits within the FPGA configured to perform these arithmetic operations). Using the Intel® Stratix® 10NX FPGA as an example, a single BFloat16 exp(x) utilizes 308 ALMs with the latency of 17 clock cycles. Implementing a 16-way SoftMax (e.g., across 16 input values in parallel) will consume almost 5,000 ALMs, which is quite expensive.

As such, aspects of embodiments of the present disclosure relate to a low-area and low-latency architecture to approximate the exponential function exp(x) in low-precision floating-point formats (e.g., BFloat16, IEEE half-precision 16-bit float (FP16), NVidia TensorFloat, AMD fp24, and Pixar PXR24). This enables the efficient scaling-up of softmax accelerators targeting state-of-the-art transformer models such as GPT-3, TNLG-XXL, etc., as well as other large artificial neural networks using exponential functions and/or softmax computations.

While some aspects of embodiments of the present disclosure will be presented herein in the context of accelerating the computation of an exponential function on values in a BFloat16 format, embodiments of the present disclosure are not limited thereto and may be applied to computing exponential functions on values represented in other low-precision floating-point formats such as IEEE half-precision 16-bit float (FP16), NVidia TensorFloat, AMD fp24, and Pixar PXR24, as identified above. As used herein, the term "low-precision floating-point" refers to floating-point representations using fewer than 32 bits.

In more detail, some aspects of embodiments of the present disclosure implement an exponential function on low-precision floating-point values using fixed point adders, constant shifters, barrel shifters, and a lookup table, without using one or more floating-point multipliers, without using one or more integer multipliers, and without using linear or quadratic interpolation, thereby enabling implementation of an exponential function with very low complexity and relatively few cycles (lower latency) over comparative implementations of exponential functions in FPGAs.

FIG. 1 is a schematic block diagram of a portion of a field programmable gate array (FPGA) configured to compute an approximation of the exponential function according to one embodiment of the present disclosure. In the embodiment shown in FIG. 1, a portion of an FPGA 10 is configured, through the interconnection and programming of logic blocks of the FPGA, to compute an approximation of an exponential function. In more detail, an input floating-point value x is supplied to the portion of the FPGA 10 (also referred to as an exponential function data path 100) to compute an output floating-point value y, where $y \approx e^x$. The exponential function data path 100 may be used as a component of a larger computational circuit within the FPGA 10, such an being one of K exponential function data paths arranged in parallel in a portion of the FPGA configured to compute a K-way softmax operation on an input vector of up to K values. The softmax operation may, in turn, be a component of a data processing path for performing higher level operations, such as the training of a neural network, alongside other operations such as activation functions, the computation of gradients in backpropagation, and the like.

A binary floating-point data format represents a number based on the combination of a mantissa (or significand), an exponent, and a sign:

$$(\text{sign})\text{base}^{exponent} \times \text{mantissa}$$

in a manner similar to "scientific notation," except that binary floating representations use a base of 2 instead of a base of 10.

In the arrangement shown in FIG. 1, the input floating-point value x and the output floating-point value y are both in the BFloat16 data format, which includes one sign bit at position [15] (the value of the sign bit being denoted as $b_{15}$), eight exponent bits at positions [14:7] (the values of the exponent bits being denoted as $b_{14} \ldots b_7$, and 7 mantissa bits at positions [6:0] (the values of the mantissa bits being denoted as $b_6 \ldots b_0$. More specifically, the BFloat16 data format is patterned after the IEEE 754 single-precision binary floating-point format (sometimes referred to as binary32, float32, or FP32), in which the exponent is represented in an offset-binary format with the zero offset (or "bias") being 127 (or 0b01111111 in binary), and therefore recovering the encoded value requires subtracting 127 from the data in the data format:

$$(-1)^{b_{15}} \times 2^{b_{14},\ldots,b_7-127} \times \left(1 + \sum_{i=1}^{7} b_{7-i} 2^i\right)$$

Other low-precision floating-point data representations may have similar arrangements, potentially with different zero offsets and with different numbers of bits allocated to the exponent and the mantissa components, as well as different total numbers of bits (e.g., fewer than 16 bits or more than 16 bits).

Referring back to FIG. 1, the exponential function data path 100 includes a first stage 110 configured to compute a scaled mantissa value $x_1$ approximating $(\log_2 e)*x$, that is, a scaling of the mantissa component of a floating-point input x by (approximately) $\log_2 e$, and a second stage or exponential stage 150 configured to compute the value of $2^{x_1}$ based on the scaled mantissa value $x_1$ and the exponent component of the floating-point input x. The operations performed by the input scaling stage 110 and the exponential stage 150 will be described in more detail below.

Figure 2A:
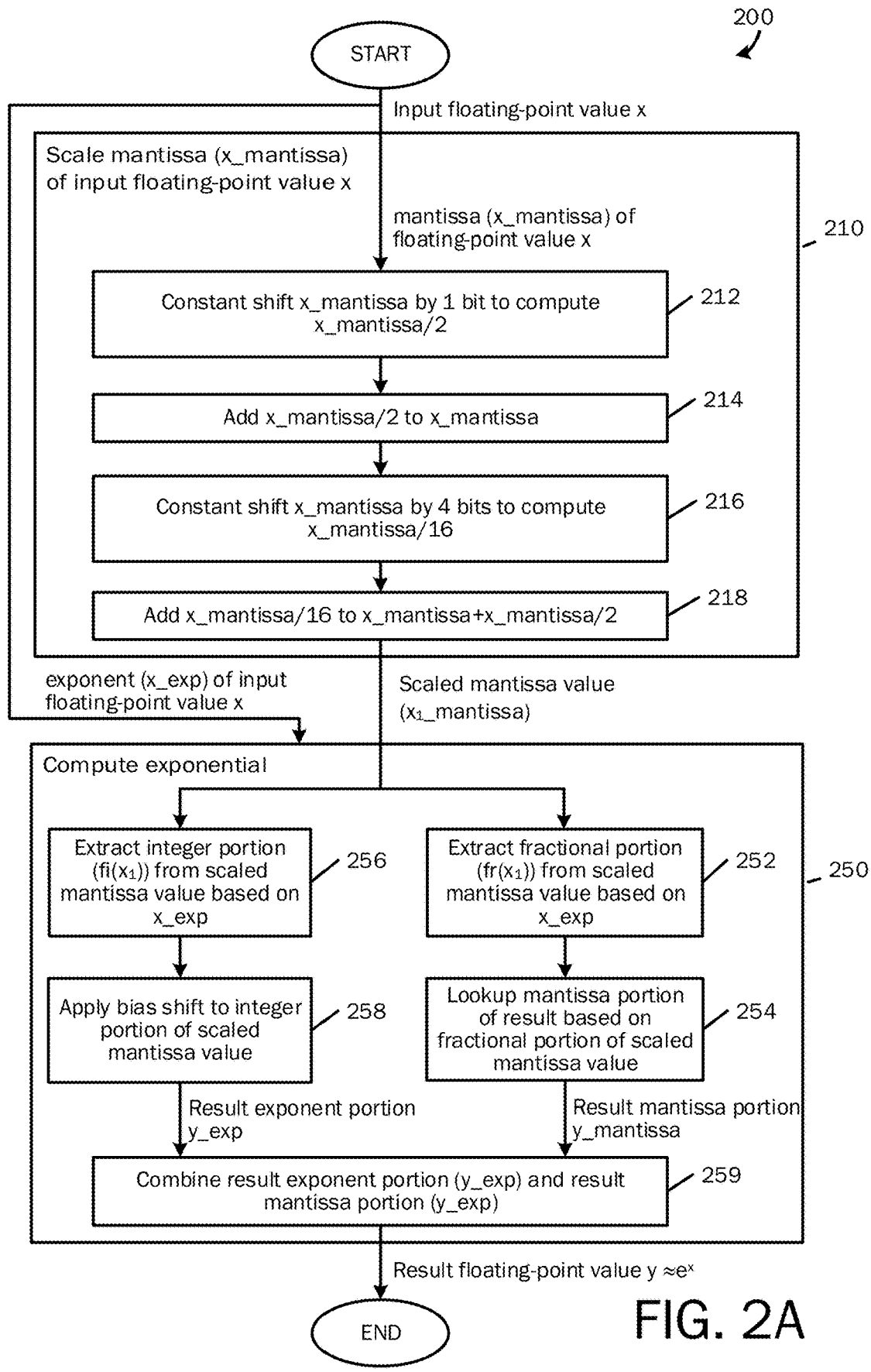
FIG. 2A is a flowchart depicting a method for computing an approximation of the exponential function according to one embodiment of the present disclosure.

FIG. 2A is a flowchart depicting a method 200 for computing an approximation of the exponential function according to one embodiment of the present disclosure.

As discussed in the background, the exponential function may be rewritten as:

$$\exp(x) = e^x = 2^{(\log_2 e)*x}$$

The first stage or input scaling stage 110 of the exponential function data path 100 relates to computing a scaled mantissa value $x_1$ in operation 210, where the scaled mantissa value $x_1$ corresponding to a scaling of the mantissa component of the floating-point input value x by an approximation of $\log_2 e$. In more detail, the value $\log_2 e$ can be approximated as the sum of a series of powers of 2. Noting that $\log_2 e \approx 1.4427$, one such approximation is:

$$2^0 + 2^{-1} - 2^{-4} = 1 + \frac{1}{2} - \frac{1}{16} = 1.4375$$

That is, $\log_2 e \approx 1.4375$. Therefore $\log_2 e$ can be approximated by a representation in canonical signed digit (CSD) form, which represents a fixed-point number using a sequence of one or more symbols −1, 0, +1, with each position representing the addition or subtraction of a power of 2. As such, the scaling operation of $(\log_2 e)*x$ can be represented as the sum of three partial products:

$$(\log_2 e)*x \approx p_1 + p_2 + p_3 = x + \frac{x}{2} - \frac{x}{16}$$

Accordingly, in operation 212, the exponential function data path 100 supplies the mantissa bits (x_mantissa) of the input x to a first constant shifter 112 (or 1-bit right shift, denoted as ">>1") to compute x/2. In particular, in binary representations of integer values, divisions by 2 and multiplications by 2 are trivially implemented using right shifts (>>) and left shifts (<<), respectively. This is similar to dividing by 10 and multiplying by 10 in base 10—by moving decimal point. In the same way, dividing by 2 can be implemented in binary by moving the bits over by one slot (performing a right shift of 1 bit). In operation 214, the exponential function data path 100 adds the output of the first constant shifter 112 to the mantissa value x_mantissa of the input using first adder 114.

Similarly, in operation 216, the exponential function data path 100 supplies the mantissa bits (x_mantissa) of the input x to a second constant shifter 116 (or 4-bit right shift, denoted as >>4) to compute x/16. Because dividing by 16 is equivalent to dividing by 2 four times, the second constant shifter 116 is configured to perform a right shift of 4 bits. In operation 218, the exponential function data path 100 uses the second adder 118 to add the output of the second constant shifter 116 to the output of the first adder 114.

In the embodiment of FIG. 1, the mantissa of the input x (x_mantissa) is shown as having 7 bits, as consistent with the BFloat16 data format, but this mantissa is supplied to a data path that is 13 bits wide. Likewise, the output of the first adder 114 is shown as being 13 bits wide. In particular, the data path used by the first adder 114 and the second adder 118 is wider than the size of the mantissa in order to preserve precision bits after performing the 1-bit and 4-bit shifts using first constant shifter 112 and second constant shifter 116, as illustrated in FIG. 3.

Figure 3:
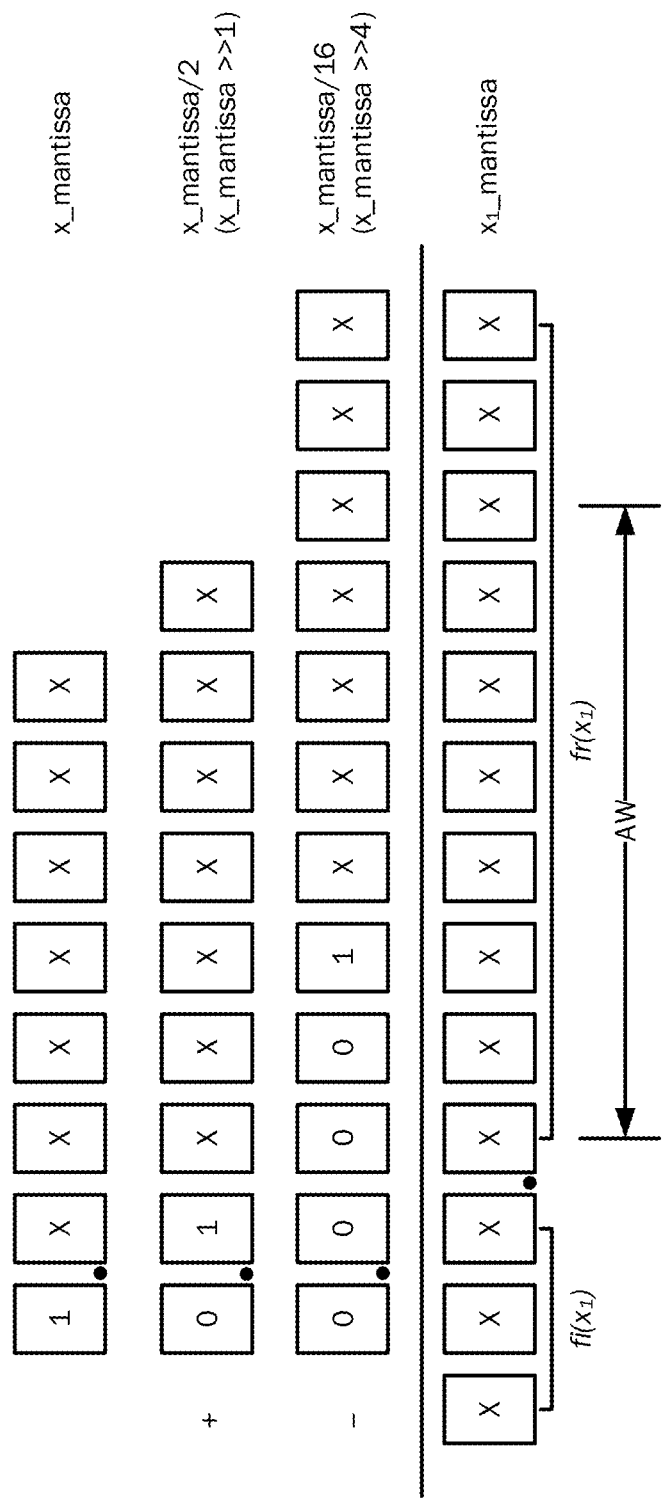
FIG. 3 is a schematic depiction of the computation of $(\log_2 e)*x$, without using a multiplier circuit, according to some embodiments of the present disclosure.

FIG. 3 is a schematic depiction of the computation of $(\log_2 e)*x$, without using a multiplier circuit, according to some embodiments of the present disclosure. As shown in FIG. 3, to compute $$x + \frac{x}{2} - \frac{x}{16},$$

the original input mantissa x_mantissa is added to x_mantissa/2 (which was computed by first constant shifter 112 in accordance with x_mantissa>>1) and x_mantissa/16 (which was computed by second constant shifter 116 in accordance with x_mantissa>>4) is subtracted from this result. The original mantissa (x_mantissa) is shown as a sequence of seven bits labeled "X." Per the definition of floating-point values in accordance with BFloat16 (and related data formats such as FP32), the mantissa bits represent a "binary fraction" that is added to a leading 1, and therefore the most significant bit (MSB) position shows a "1." A separator mark (a dot or point or "decimal" point) is shown between the leading 1 and the "X" bits of the mantissa to separate the integer portion to the left of the mark from the fractional portion to the right of the mark.

The x_mantissa/2 value is the same as the x_mantissa value, but shifted to the right by 1 bit. As such, the leading "1" is moved to the right of the separator mark, followed by the same 7 bit values (labeled X) from the x_mantissa. Likewise, the x_mantissa/4 is the same as the x_mantissa value, but shifted to the right by 4 bits.

As shown in FIG. 3, in order to preserve all of the precision bits when performing this particular addition of 7 bit mantissa values, a 13-bit wide adder is used. In particular, the right shift of 4 (>>4) causes the fractional portion to extend an additional 4 bits to the right, the leading "1" causes the extension of one more bit on the left, and the possibility of overflow during the addition causes the extension of one further bit to the left, for a total of 13 bits. However, embodiments of the present disclosure are not limited to this particular arrangement of 13 bits, which is specific to the case where the mantissa of a floating-point value is represented using 7 bits. In other embodiments, the mantissa may be represented with fewer than 7 bits or more than 7 bits, and therefore the first adder 114 and/or the second adder 118 may use a data path that is narrower or wider than 13 bits accordingly. In addition, in some embodiments, the value of $(\log_2 e)$ may be approximated using additional terms (e.g., by adding or subtracting additional powers of 2, apart from the three terms $$1 + \frac{1}{2} - \frac{1}{16}),$$

which may therefore require additional bits to preserve the additional precision in accordance with the further right shifts associated with the additional terms.

Accordingly, the products x/2 and x/16 were computed without using separate multiplier circuits that would be used to compute arbitrary floating-point multiplications, such as the multiplication of the value 1.4427 directly with an arbitrary input floating-point value x. Instead, performing right shifts of 1-bit and 4-bits takes very little space in the FPGA. For example, the constant shifters performing the right shifts may be implemented by directly connecting portions of a register holding the mantissa of the input floating-point value directly to particular input lines of the first adder 114 and the second adder 118 at offsets corresponding to their bit shifts (e.g., offset by one bit to the right for the 1-bit first constant shifter 112 and offset by four bits to the right for the 4-bit second constant shifter 116). As a specific example, in the case of the 13-bit data path and 13-bit adders shown in FIG. 1, the 7-bit x_mantissa value may be supplied to positions [10:4] of one input to the first adder 114 (with the hidden bit 1 at position 11), the 7-bit x_mantissa/2 value may be supplied directly to positions [9:3] of another input of the first adder 114. Likewise, the 7-bit x_mantissa/16 value may be supplied directly to positions [6:0] of an input of the second adder 118 (and the output of the first adder 114 is supplied to the other input of the second adder 118 at positions [12:3]). As such, in some embodiments, the constant shifters are implemented without consuming any logic blocks of the FPGA 10.

Referring back to FIG. 1, the output of the second adder 118 is a scaled mantissa value (representing $x_1$_mantissa, the mantissa portion of the input x_mantissa scaled by $\log_2 e$ as approximated by $$1 + \frac{1}{2} - \frac{1}{16}\Big)$$

is supplied as an input to the exponential stage 150, which is configured to compute $2^{x_1}$ (or alternatively denoted as $\exp_2(x_1)$) in operation 250. In general, the exponential stage 150 of the data processing path computes (or looks up) a result mantissa portion (y_mantissa) of the result y based on a bit fractional portion of the $x_1$_mantissa computed by the input scaling stage 110 using a lookup table and computes the result exponent portion (y_exp) of the result y based on an integer portion of the $x_1$_mantissa.

The lookup table used to compute the mantissa portion (y_mantissa) of the result y may be designed in size based on tradeoffs between the desired precision of the output and the space (e.g., number of logic blocks) consumed by the lookup table. In addition, in some embodiments of the present disclosure, the input x to the exponential function data path 100 is constrained to a particular domain, which may further reduce the size of the lookup table by reducing domain of possible inputs to the lookup table.

In more detail, in some embodiments of the present disclosure, the input x to the exponential function data path 100 is designed to be less than or equal to 0. This halves the potential input space from $(-\infty, \infty)$ to $(-\infty, 0]$, noting that $\infty$ and $-\infty$ are typically special defined values in various floating-point data formats, including BFloat16. This restriction of the input domain to non-positive numbers $(-\infty, 0]$ is acceptable in, for example, the computation of a K-way softmax function across a vector of K values. In particular, the softmax of an i-th input $x\_i$ of the K-way softmax may be computed equivalently as:

$$\text{softmax}(x_i) = \frac{\exp(x_i - x_{max})}{\sum_j \exp(x_j - x_{max})}$$

where $x_{max}$ is the maximum value of the input vector of K values.

Accordingly, in some embodiments, the FPGA 10 is configured to include an input domain reduction data path, implemented by a configured plurality of logic blocks of the FPGA 10, that identifies the maximum value $x_{max}$ of an input vector of K values and subtracts the maximum value $x_{max}$ from each of the K values such that each of the K shifted values is a non-positive number in the range $(-\infty, 0]$. These K shifted values (e.g., $x_i - x_{max}$) computed by the input domain reduction data path may then be supplied as the inputs to one or more exponential function data paths 100, as discussed above, as part of the process for computing the K-way softmax of the input vector of K values.

As shown in FIG. 3, the computed 13 bit sum $x_1$_mantissa of x_mantissa, x_mantissa/2, and x_mantissa/16 includes an integer portion $\text{fi}(x_1$_mantissa) (for convenience, written herein as $\text{fi}(x_i)$) corresponding to the bits to the left of the separator mark and a fractional portion $\text{fr}(x_1$_mantissa) (for convenience, written hereinafter as $\text{fr}(x_1)$) to the right of the separator mark, where $\text{fi}(x_1) \geq 1$ and $\text{fr}(x_1) \in [0,1)$. Separating the integer portion from the fractional portion allows the exponential stage 150 computing $2^{x_1}(\exp_2(x_1))$, where $$x_1 \approx x + \frac{x}{2} + \frac{x}{16}\Big)$$

to be decomposed and computed as follows:

$$\exp_2\!\Big(x + \frac{x}{2} + \frac{x}{16}\Big) =$$
$$\exp_2(x_1) = \exp_2(\text{fi}(x_1) + \text{fr}(x_1)) = \exp_2(\text{fi}(x_1)) \times \exp_2(\text{fr}(x_1))$$

In some embodiments, the exponential stage 150 of the exponential function data path 100 is configured to determine which bits of the $x_1$_mantissa computed by the input scaling stage 110 form the integer portion $\text{fi}(x_1)$ and the which bits form the fractional portion $\text{fr}(x_1)$ based on the exponent portion x_exp of the input value x. In particular, the separator mark is shifted to the right by a number of bits equal to the logical value of the exponent portion x_exp. Based on an assumed bias value of 127, when x_exp is 127 (corresponding to a logical value of 127−127=0), the separator mark is not shifted and therefore, in the case of a 13 bit $x_1$_mantissa output of the input scaling stage 110, the integer portion $\text{fi}(x_1)$ corresponds to the two most significant bits ([12:11]) of the result $x_1$_mantissa and the fractional portion $\text{fr}(x_1)$ corresponds to the remaining bits ([10:0]).

In the example shown in FIG. 3, it is assumed that x_exp=128 (corresponding to a logical value of 128−127=1), and therefore the separator mark is shifted one bit to the right, such that the integer portion $\text{fi}(x_1)$ corresponds to the three most significant bits ([12:10]) of the result $x_1$_mantissa and the fractional portion $\text{fr}(x_1)$ corresponds to the remaining bits ([9:0]).

In a case where x_exp=129 (corresponding to a logical value of 129−127=2), the separator mark is shifted two bits to the right, such that the integer portion $\text{fi}(x_1)$ corresponds to the four most significant bits ([12:9]) of the result $x_1$_mantissa and the fractional portion $\text{fr}(x_1)$ corresponds to the remaining bits ([8:0]). Similarly, for negative unbiased exponents (e.g., when x_exp<127), the separator mark is shifted to the left, which causes $\text{fi}(x_1)$ to be 0 when x_exp<126 (because there are no remaining MSBs in $x_1$ for the integer portion $\text{fi}(x_1)$), and possibly 0 when x_exp<126, depending on whether the MSB (e.g., at position [12] as shown in FIG. 3) is 0 or 1.

In more detail, in operation 252, the output $x_1$_mantissa of the second adder 118, is supplied as input to a first barrel shifter 152 and a second barrel shifter 156. The first barrel shifter is configured to extract the fractional portion $\text{fr}(x_1)$ by performing a least significant bits extraction (e.g., a left shift (<<)) on the computed $x_1$_mantissa value based on the exponent portion x_exp of the input x, as adjusted by the bias of the exponent component and the length of the output $x_1$_mantissa of the input scaling stage 110. In the specific example discussed herein of BFloat16 and a separator mark that logically falls between positions 10 and 11 of the output mantissa, a left shift of x_exp−bias+2 bits (as noted above the bias value in the BFloat16 data format is 127) will discard the most significant bits corresponding to the integer portion $\text{fi}(x_1)$ to leave only the fractional portion $\text{fr}(x_1)$.

In some embodiments, a particular number of the most significant bits are extracted from the fractional portion $\text{fr}(x_1)$, where the particular number of bits is referred to as the "address width" (AW), reflecting the number of bits used to look up an entry in an exponential lookup table 154 having $2^{AW}$ entries. In particular, the exponential lookup table 154 that stores a mapping from AW input bits to corresponding approximation of $\exp_2(fr(x_1))$ within the domain $x \in (-1,0]$. The exponential lookup table 154 stores $2^{AW}$ entries, each entry having a number of bits equal to the length of the result mantissa y_mantissa, for a total size of $2^{AW} \times \{$length of y_mantissa$\}$ bits (e.g., in the case of BFloat16 where y_mantissa has 7 bits, the exponential lookup table 154 stores $2^{AW} \times 7$ bits) to cover the domain of all possible AW-bit fractional portions $fr(x_1)$ of the input. Therefore, in operation 254, the output of the first barrel shifter 152, representing $fr(x_1)$, is supplied as input to the exponential lookup table 154 to compute $\exp_2(fr(x_1))$. The output of the exponential lookup table 154 is then output directly to form the mantissa portion (y_mantissa) of the output y of the exponential function data path 100 (e.g., output as the seven least significant bits [6:0] of the output y, as illustrated in the embodiment of FIG. 1).

At operation 256, the output $x_1$_mantissa of the input scaling stage 110 is supplied to the second barrel shifter 156 which is configured to right shift (>>) the $x_1$_mantissa to extract the integer portion $fi(x_i)$ based on the exponent portion x_exp of the input x, as adjusted by the bias of the exponent component and the length of the output $x_1$_mantissa of the input scaling stage 110. Continuing the above example, the 13-bit $x_1$_mantissa value is shifted to the right by bias−x_exp+11 bits to discard the least significant bits corresponding to the fractional portion $fr(x_1)$ to leave only the integer portion $fi(x_1)$.

The extracted integer portion $fi(x_1)$ corresponds directly to the exponent portion y_exp of the output, but in unbiased form. As such, in operation 258, the integer portion $fi(x_i)$ is supplied to a third adder 158, which adds a bias value corresponding to the floating-point data format to generate the final value of y_exp. In the embodiment shown in FIG. 1, the third adder 158 is illustrated as adding a value of 126 to the integer portion $fi(x_1)$. The added value is 126 rather than 127 in order to account for the "hidden bit" (in accordance with the "leading bit convention" or "implicit bit convention" or "hidden bit convention") having a value of 1 that is not explicitly encoded in the data format (see, e.g., FIG. 3, which shows a hidden bit with value "1" to the left of the separator mark in the row for x_mantissa). The computed, biased value corresponding to integer portion $fi(x_1)$ is then output directly as the exponent value y_exp of the result y in operation 259 along with the mantissa value y_mantissa of the result y. Because the output range of the exponential function is a positive non-zero number in the range (0, ∞], the sign bit of the result y is 0, indicating that y is positive number. Accordingly, an exponential function data path 100 as described herein with respect to FIGS. 1-3 computes a result value y that approximates an exponential function as applied to an input value x, where $y \approx e^x$.

Figure 2B:
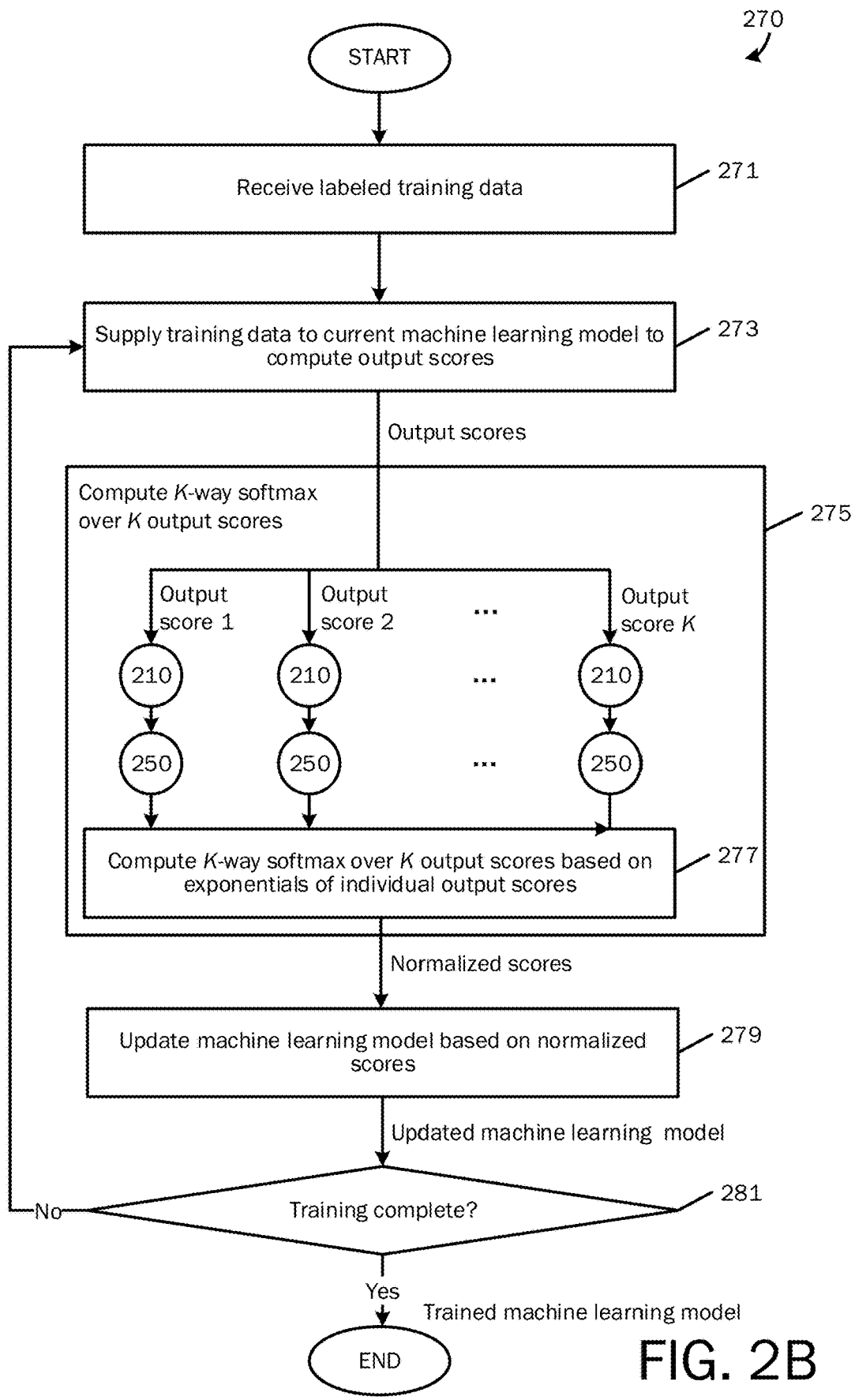
FIG. 2B is a flowchart depicting a method for training a machine learning model, such as a deep neural network (DNN) using an approximation of the exponential function according to one embodiment of the present disclosure.
Figure 7:
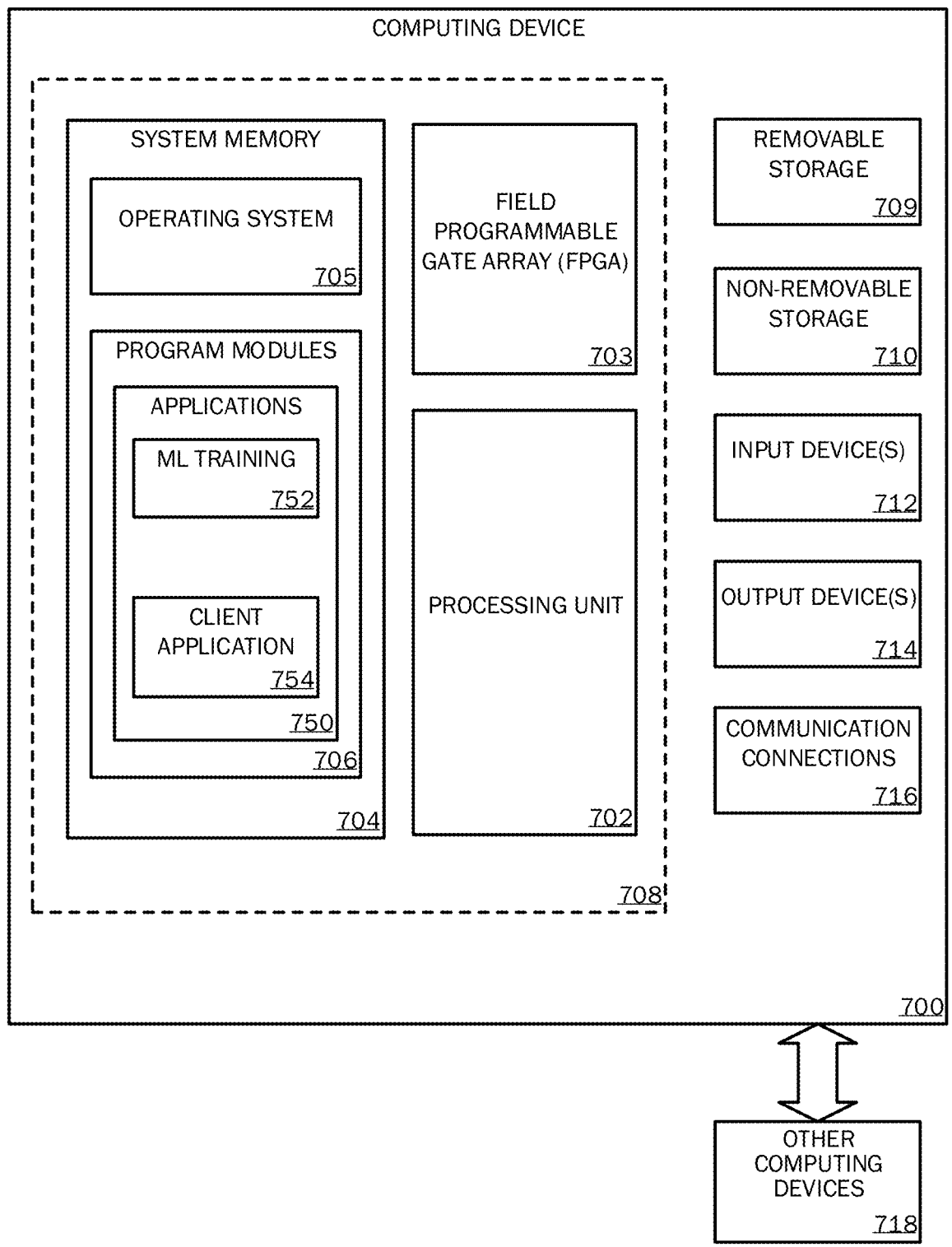
FIG. 7 is a block diagram illustrating example physical components of a computing device with which aspects of the invention may be practiced.

FIG. 2B is a flowchart depicting a method 270 for training a machine learning model, such as a deep neural network (DNN), using an approximation of the exponential function according to one embodiment of the present disclosure. In the embodiment shown in FIG. 2B, a machine learning model training application (see, e.g., machine learning training application 752 running on a computing device including an FPGA, as shown in FIG. 7) performs a supervised learning algorithm to train a machine learning model based on a collection of labeled input data. In the example shown in FIG. 2B, the machine learning model training application receives labeled training data in operation 271, and supplies the training data (e.g., a batch of training data) to a current machine learning model to compute output scores (e.g., supplies an input vector of values from a data sample of the training data to a deep neural network). In operation 275, the machine learning model training application computes a K-way softmax over K output scores, which includes supplying each output score of the output scores to exponential function data paths (e.g., K separate exponential function data paths implemented in parallel in an FPGA) to compute exponential of each of the output scores in accordance with the techniques described above with respect to FIGS. 1 and 2A and operations 210 and 250 of method 200, and then, in operation 277, computing the K-way softmax based on the individual exponentials (e.g., dividing each individual exponential by the sum of the K exponentials). In operation 279, the machine learning model training application updates the machine learning model based on the normalized scores to generated an updated machine learning model (e.g., in a deep neural network, by comparing the normalized scores with the labels of the training data and updating the weights of the connections between neurons through gradient descent and backpropagation). In operation 281, the machine learning model training application determines whether training is complete (e.g., whether a maximum number of training intervals or training epochs has been completed or if the performance of the machine learning model has converged), and if not, then the training process may continue by returning to operation 273 using the updated machine learning model. If the training process is complete, then the updated machine learning model is output as a trained machine learning model and stored and the training process ends. The stored, trained machine learning model may then be deployed for use in performing inference tasks (e.g., making predictions or estimates) based on live data similar to the training data (e.g., natural language input data, images, etc.) by processing the live data with the trained machine learning model to generate an output (e.g., a classification of the input live data or a predicted next item in a sequence).

In embodiments where the input to the exponential function is constrained to non-positive values x (e.g., $x \in (-\infty, 0]$), numerical analysis shows that, for values encoded in BFloat16, the exponential function converges to 0 when the biased exponent component (x_exp) of the input x is larger than 133 (noting that the bias of 127 means that an encoded value of 133 translates to a logical exponent of 6). For example, when the biased exponent is 134, indicating a logical exponent of 134−127=7:

$$\exp(-2^7) = \exp(-128) \approx 2.5722 \times 10^{56}$$

which is a small number that rounds to zero in the low-precision floating-point representation of BFloat16.

At the other end, when the biased exponent x_exp is less than 109, then the value of x is very close to 0, and therefore the value of exp(x) can be approximated to 1.0. For example, when x_exp is 108, indicating a logical exponent of 108−127=−19):

$$\exp(-2^{-19}) = \exp(-1/524288) \approx 0.9999981$$

Figure 4A:
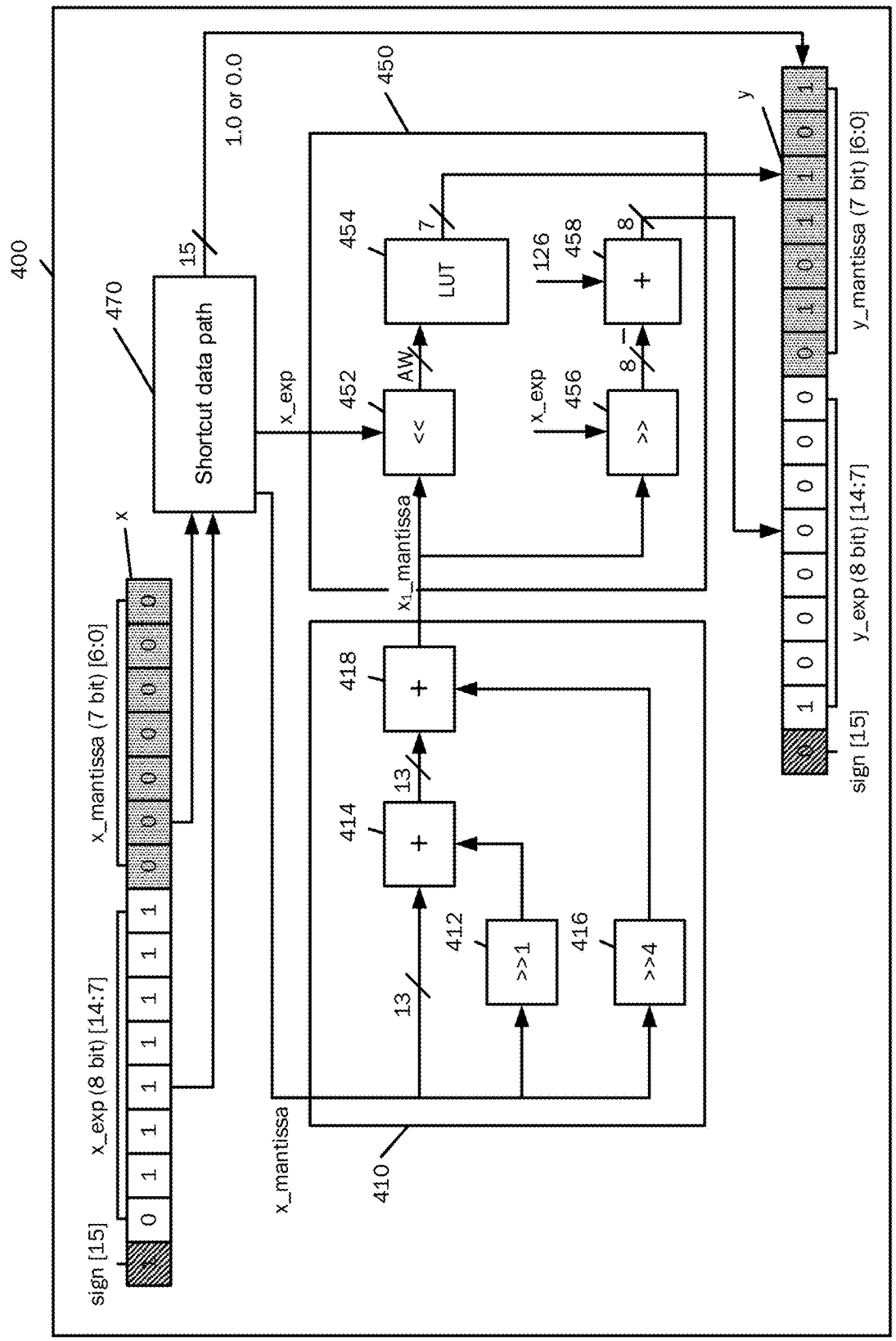
FIG. 4A is a schematic block diagram of a portion of a field programmable gate array (FPGA) configured to compute an approximation of the exponential function, further including a shortcut data path according to one embodiment of the present disclosure.
Figure 4B:
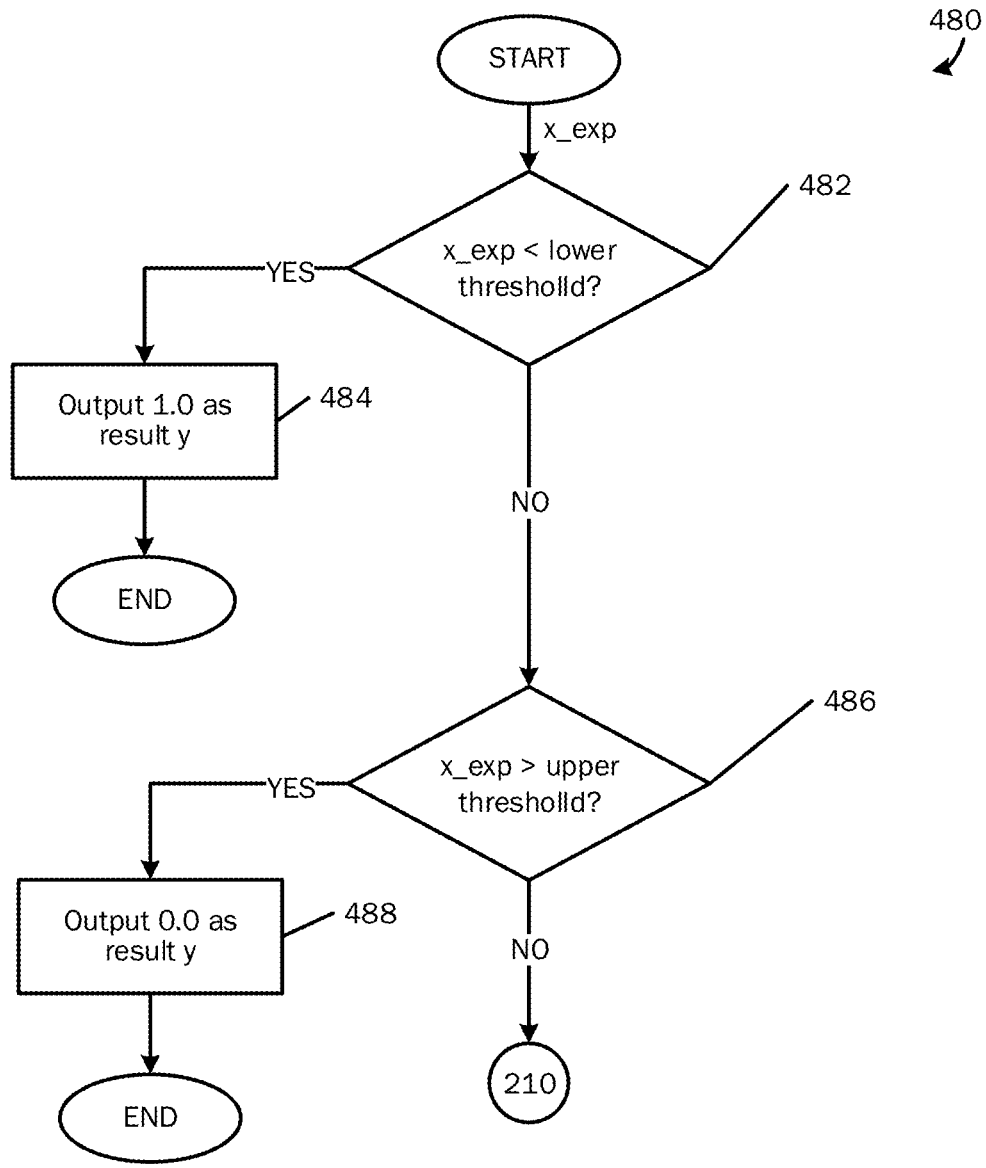
FIG. 4B is a flowchart depicting a method for performing a shortcut or short circuit computation of an approximation of the exponential function according to one embodiment of the present disclosure.

As such, in some embodiments of the present disclosure configured to perform computations on low-precision floating-point values such as data in the BFloat16 data format, the exponential function data path includes a shortcut data path. FIG. 4A is a schematic block diagram of an exponential function data path 400 configured to compute an approximation of the exponential function, further including a shortcut data path 470 according to one embodiment of the present disclosure. FIG. 4B is a flowchart depicting a method 480 for performing a shortcut or short circuit computation of an approximation of the exponential function according to one embodiment of the present disclosure.

In some embodiments, the shortcut data path 470 is configured to determine whether to shortcut (or short-circuit) the computation of the exponential function based on the value of the exponent component (x_exp) of the input x. In more detail, the shortcut data path 470 may include a first comparator configured to compare, in operation 482, the biased exponent component x_exp of the input x to a lower threshold (e.g., a lower threshold of 109 in the case of BFloat16 values) and produces a value 1.0 as the result y in operation 484 when x_exp is smaller than the lower threshold, therefore skipping over or shortcutting the data path that includes the first stage 410 and the exponential stage 450. If x_exp is greater than or equal to the lower threshold, then the shortcut data path 470 may supply the biased exponent component x_exp to a second comparator configured to compare the biased exponent component x_exp of the input x to an upper threshold (e.g., an upper threshold of 133 in the case of BFloat16 values) in operation 486 and produces a value 0.0 as the output y in operation 488 when x_exp is larger than the upper threshold, skipping over or shortcutting the data path that includes the first stage 410 and the exponential stage 450. Otherwise (e.g., the value of x_exp is in the domain between the lower and upper thresholds, such as [109, 133]), then shortcut data path 470 supplies the biased exponent component x_exp and the mantissa component x_mantissa to the input scaling stage 410 and the exponential stage 450 (similar to the input scaling stage 110 and the exponential stage 150 described above) to compute the exponential function as described above, such as by continuing with operation 210 of FIG. 2A. The functions of the first constant shifter 412, the first adder 414, the second constant shifter 416, the second adder 418, the first barrel shifter 452, the exponential lookup table 454, the second barrel shifter 456, and the third adder 458 are substantially similar to corresponding components described above with respect to FIGS. 1-3, and therefore descriptions thereof will not be repeated herein.

In the embodiment shown in FIG. 4A, the output of the shortcut data path 470 is shown as a 15 bit output because, as noted above, the sign bit of the output y is always 0, indicating that y is positive number. Embodiments of the present disclosure are not limited thereto and, in some embodiments, the shortcut data path 470 also outputs the sign bit of the output y of the exponential function data path 100.

In these embodiments where the domain of exponent values x_exp that are provided as input through the exponential stage 450, in some embodiments the first barrel shifter 452 and the second barrel shifter 456 are implemented by lookup tables because the shifting amount is limited by the constrained input exponent domain, thereby further reducing the space (e.g., number of FPGA logic blocks) consumed by exponential function data paths according to embodiments While the analysis for BFloat16 indicates that 109 may serve as a lower threshold value for the exponent of the input and 133 may serve as an upper threshold for exponent of the input perform the shortcut approximation of 1.0 or 0.0, respectively, embodiments of the present disclosure are not limited thereto, and the particular lower and upper thresholds may vary based on the precision of the floating-point data format to be operated on by an FPGA configured to compute an exponential function on floating-point inputs according to various embodiments of the present disclosure.

Likewise, as noted above, other choices in the design of the exponential data path according to various embodiments of the present disclosure may vary with respect to the particular choice of floating-point data format being used. These parameters include the number of terms used to approximate $\log_2 e$ in the input scaling stage 110, which may affect the number of bits in the adders used in the input scaling stage 110, the number of bits used in AW, the number of result exponent bits and mantissa bits in accordance with the target floating-point data format, the size of the exponential lookup table 154, and the like. Examples of other low-precision floating-point formats include: IEEE half-precision 16-bit float (which has 1 sign bit, 5 exponent bits, and 10 mantissa bits), Nvidia TensorFloat (which has 1 sign bit, 8 exponent bits, and 10 mantissa bits), AMD fp24 (which has 1 sign bit, 7 exponent bits, and 16 mantissa bits), and Pixar PXR24 (which has 1 sign bit, 8 exponent bits, and 15 mantissa bits).

As such, aspects of embodiments of the present disclosure provide architectures for implementing data paths in FPGAs to compute approximations of the exponential function on low-precision floating-point inputs. Embodiments of the present disclosure provide simpler implementations involving fewer logic blocks than comparative implementations of the exponential function in FPGAs. For example, the embodiment shown in FIG. 1 merely includes three integer adders, two constant-amount-shifters, two barrel shifters, and one look-up table with 7-bit data output. The constant-amount-shifters do not require any FPGA hardware resources (e.g., can be implemented by supplying inputs to particular pins of the adders). The barrel shifters can be implemented by table lookup because the shifting amount is limited due to the constrained input exponent range. AW, representing the number of MSBs from fr(x) to provide the read address of the LUT, controls the table size (e.g., to $7 \cdot 2^{AW}$ bits for a 7-bit mantissa of the output). In some embodiments, AW is chosen to be 5 in order to provide a tradeoff between precision and hardware resource in a target application of softmax for a transformer neural network. Embodiment of the present disclosure implement an exponential function using zero multipliers (e.g., without any multipliers such as floating-point multipliers to perform any linear or quadratic interpolation), thereby achieving significant hardware resource savings (e.g., usage of fewer logic blocks) over comparative implementations of an exponential function in an FPGA and achieving lower latency (faster performance) because a lookup in a lookup table has lower latency than a multiplier.

To validate the numerical accuracy of architectures according to embodiments of the present disclosure, all BFloat16 values over a domain of $(-\infty, 0]$ were supplied as inputs x to an implementation of the present disclosure based on the above parameters described with respect to FIG. 1 to compute corresponding approximations of the exponential function. These values computed based on embodiments of the present disclosure were then compared to a "ground truth" or reference value computed in the FP32 data format using a standard reference implementation of the exponential function.

Figure 5A:
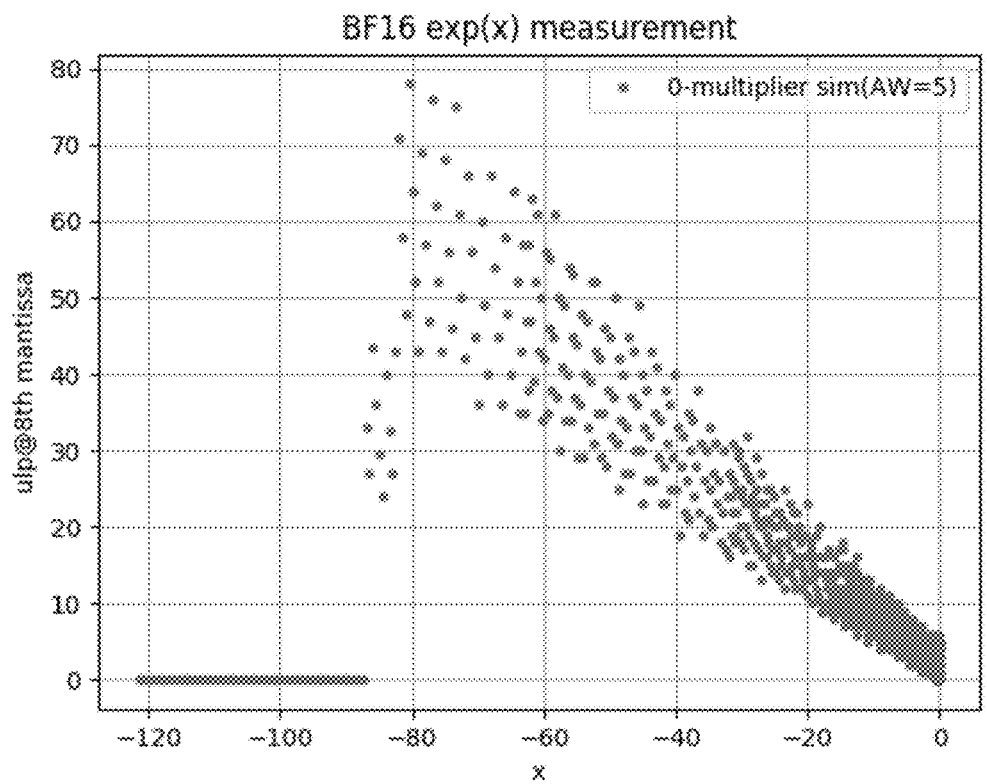
FIG. 5A is a graph depicting the error associated with computing the exponential function using systems and methods according to one example embodiment of the present disclosure, in comparison to a reference implementation of the exponential function.

FIG. 5A is a graph depicting the error associated with computing the exponential function using systems and methods according to one example embodiment of the present disclosure, in comparison to a reference implementation of the exponential function. As seen in FIG. 5A, the error is in a range of about [0, 78] ulp (unit of least precision, referring to the spacing between two consecutive floating-point numbers) when the address width is set to 5 bits (AW=5). At values of x smaller than about −90, the error drops to 0 ulp due to the rounding of the output values to 0.0.

Figure 5B:
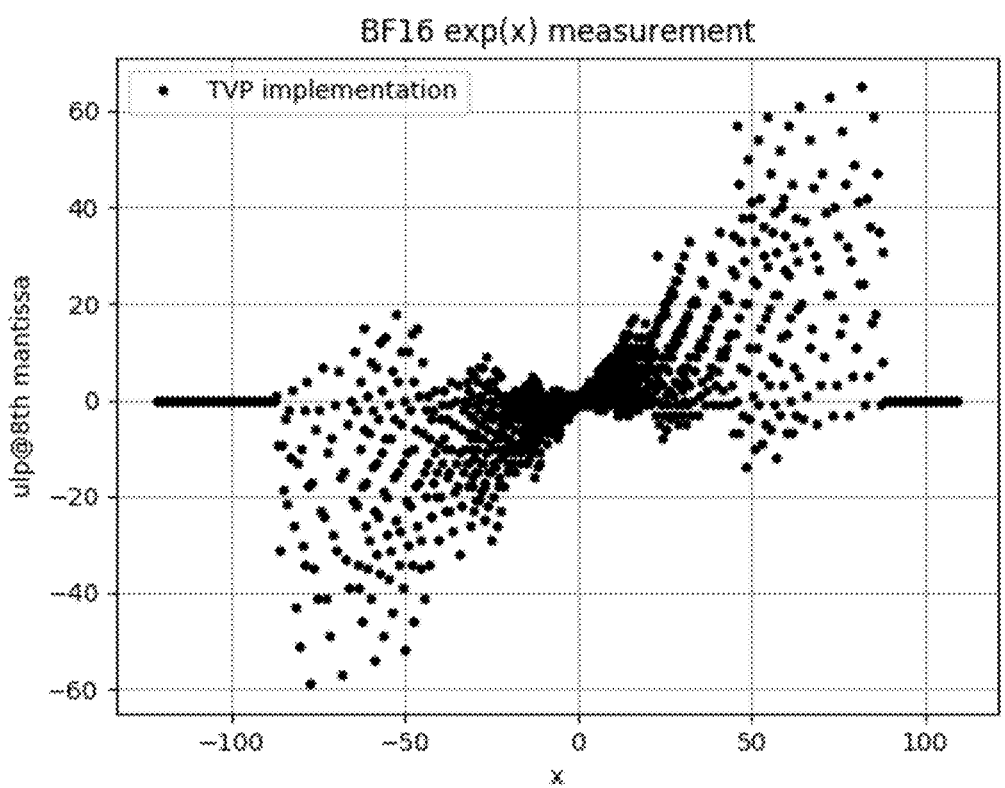
FIG. 5B is a graph depicting the error associated with computing the exponential function using a comparative quadratic interpolation-based technique, in comparison to the same reference implementation of the exponential function used in FIG. 5A.

FIG. 5B is a graph depicting the error associated with computing the exponential function using a comparative quadratic interpolation-based technique (similar to that described in Piñeiro et al.), in comparison to the same reference implementation of the exponential function used in FIG. 5A. As seen in FIG. 5B, the error is in a similar range of about [0, 60] ulp. In embodiments of the present disclosure as shown in FIG. 5A and comparative implementations as shown in FIG. 5B, the peak ulp error corresponds to larger magnitude inputs x. With smaller inputs in the range of [−20, 0], the error characteristics between embodiments of the present disclosure and the comparative approach using quadratic interpolation. Note that FIG. 5A illustrates test results on embodiments of the present disclosure that have a reduced input domain of values less than or equal to 0 and therefore the graph in FIG. 5A shows only non-positive input values of x, whereas the quadratic interpolation approach also accepts positive input values of x and therefore FIG. 5B shows both negative and positive input values.

To further numerically validate embodiments of the present disclosure in the context of training artificial neural networks, a transformer neural network model was trained over the course of 50,000 training iterations using an exponential function data path according to embodiments of the present disclosure to compute the exponential function, and, separately, training the same transformer neural network using a single precision (e.g., FP32) reference implementation of the exponential function.

Figure 6B:
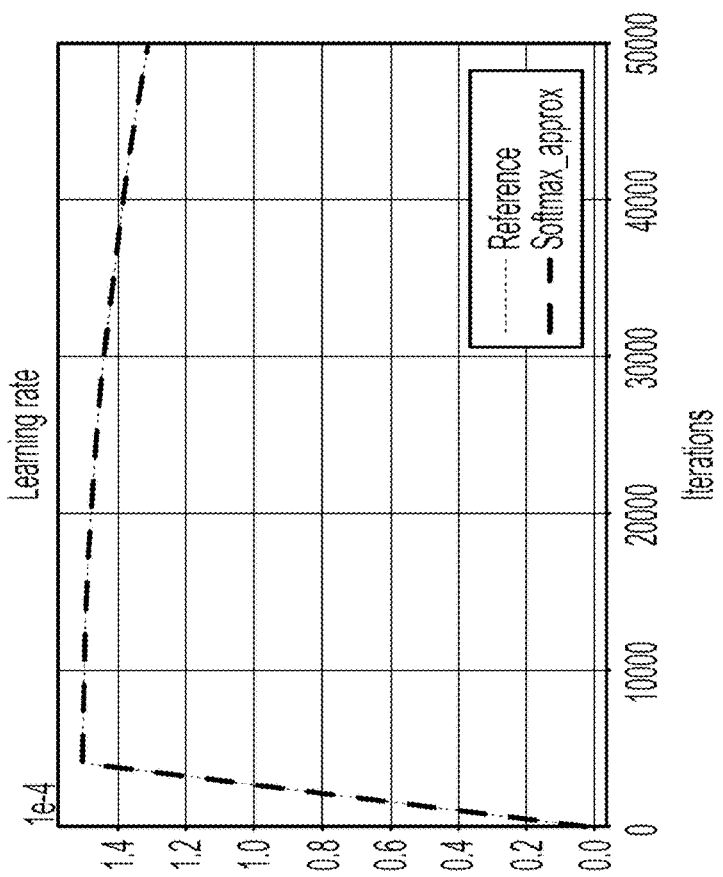
FIG. 6B is graph showing learning rate over the course of 50,000 training iterations when training a transformer model trained using a single-precision FP32 reference implementation of the exponential function compared against training loss when training the same transformer model using a BFloat16-based implementation of the exponential function in accordance with embodiments of the present disclosure.
Figure 6A:
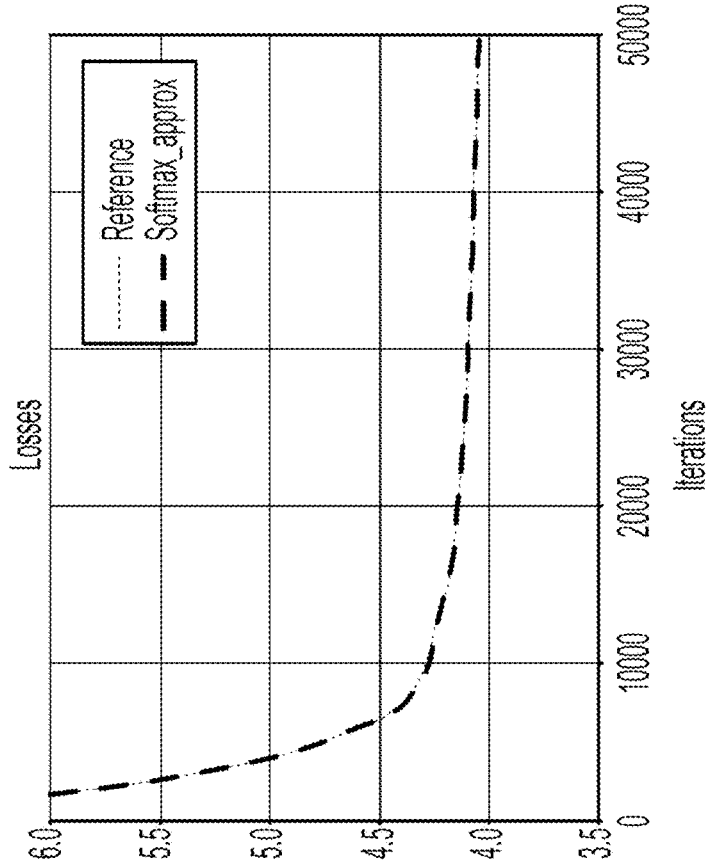
FIG. 6A is graph showing training loss over the course of 50,000 training iterations when training a transformer model trained using a single-precision FP32 reference implementation of the exponential function compared against training loss when training the same transformer model using a BFloat16-based implementation of the exponential function in accordance with embodiments of the present disclosure.

FIG. 6A is graph showing training loss over the course of 50,000 training iterations when training a transformer model trained using a single-precision FP32 reference implementation (labeled "Reference") of the exponential function compared against training loss when training the same transformer model using a BFloat16-based implementation of the exponential function in accordance with embodiments of the present disclosure (labeled "Softmax_approx"), and FIG. 6B is graph showing learning rate of both training processes (with corresponding labels "Reference" and "Softmax_approx") over the course of the 50,000 training iterations. As shown in FIG. 6A and FIG. 6B, no convergence degradation is observable over the course of the training process, as the training loss curves for the two implementations and the learning rate curves for the two implementations are substantially the same.

Accordingly, aspects of embodiments of the present disclosure provide numerical accuracy comparable to other implementations of the exponential function in FPGAs. In addition, aspects of embodiments of the present disclosure utilize fewer resources on a FPGA than comparable implementations and compute the exponential function with lower latency than these comparable implementations.

A first comparable implementation using the approach of Piñeiro et al. uses approximately 300 ALMs of an FPGA to implement the exponential function. A second comparable implementation using an approach described in Langhammer, Martin, and Bogdan Pasca. "Faithful single-precision floating-point tangent for FPGAs." *Proceedings of the ACM/SIGDA international symposium on Field programmable gate arrays*. 2013. uses approximately 225 ALMs of an FPGA to implement the exponential function. In contrast, one embodiment of the present disclosure implements the exponential function using 67 ALMs, resulting in approximately 78% reduction in FPGA area used by the exponential function.

The first comparable implementation has a processing latency of 17 cycles to compute the exponential of a given input, and the second comparable implementation has a processing latency of 11 cycles. In contrast, embodiments of the present disclosure are capable of computing the exponential of a given input in 3 cycles, resulting in a latency savings of 82.4%.

Therefore, embodiments of the present disclosure significantly increase the computing density of exp(x) by 3.59× over comparable implementations of exp(x) (computing density indicates the amount computation with unit area and is characterized by FLOPS/ALM in FPGA). Using architectures in accordance with embodiments of the present disclosure reduces the area of an FPGA-implemented softmax accelerator by approximately 35%. This reduced area also improves scalability when handling larger machine learning models—for example, doubling the width of the input vector to the SoftMax accelerator (e.g., from K values to 2K values), using implementations of exp(x) in accordance with embodiments of the present disclosure will only cost a marginal extra area of ~3.4% to double the computing throughput.

While various embodiments of the present disclosure are presented herein in the context of computing the exponential function with base e (Euler's number), embodiments of the present disclosure are not limited thereto and may also include functions where a different base b (e.g., other than base e) is raised to a power of an input argument. Such embodiments to use a base b may be implemented by implementing the scaling stage to scale the input mantissa by a value of $\log_2 b$ and modifying the lookup table of the exponential stage based on the values over the domain $x \in (-1,0]$ for $b^x$ instead of $e^x$. In embodiments that include a shortcut data path 470, the lower threshold and the upper threshold may also be adjusted based on the numerical characteristics of the modified base b and the floating-point data format used in the updated circuit.

Figure 8A:
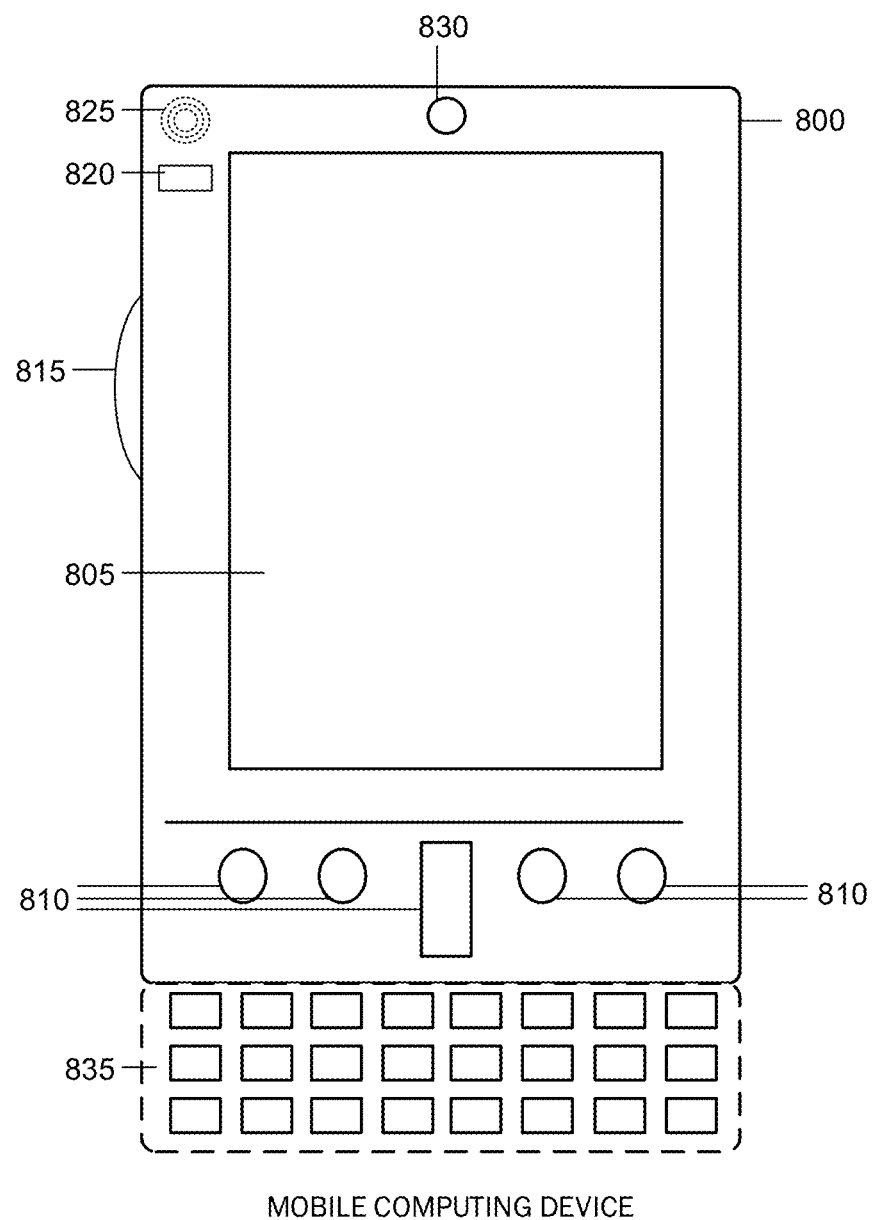
FIGS. 8A and 8B are simplified block diagrams of a mobile computing device with which aspects of the present invention may be practiced.
Figure 8B:
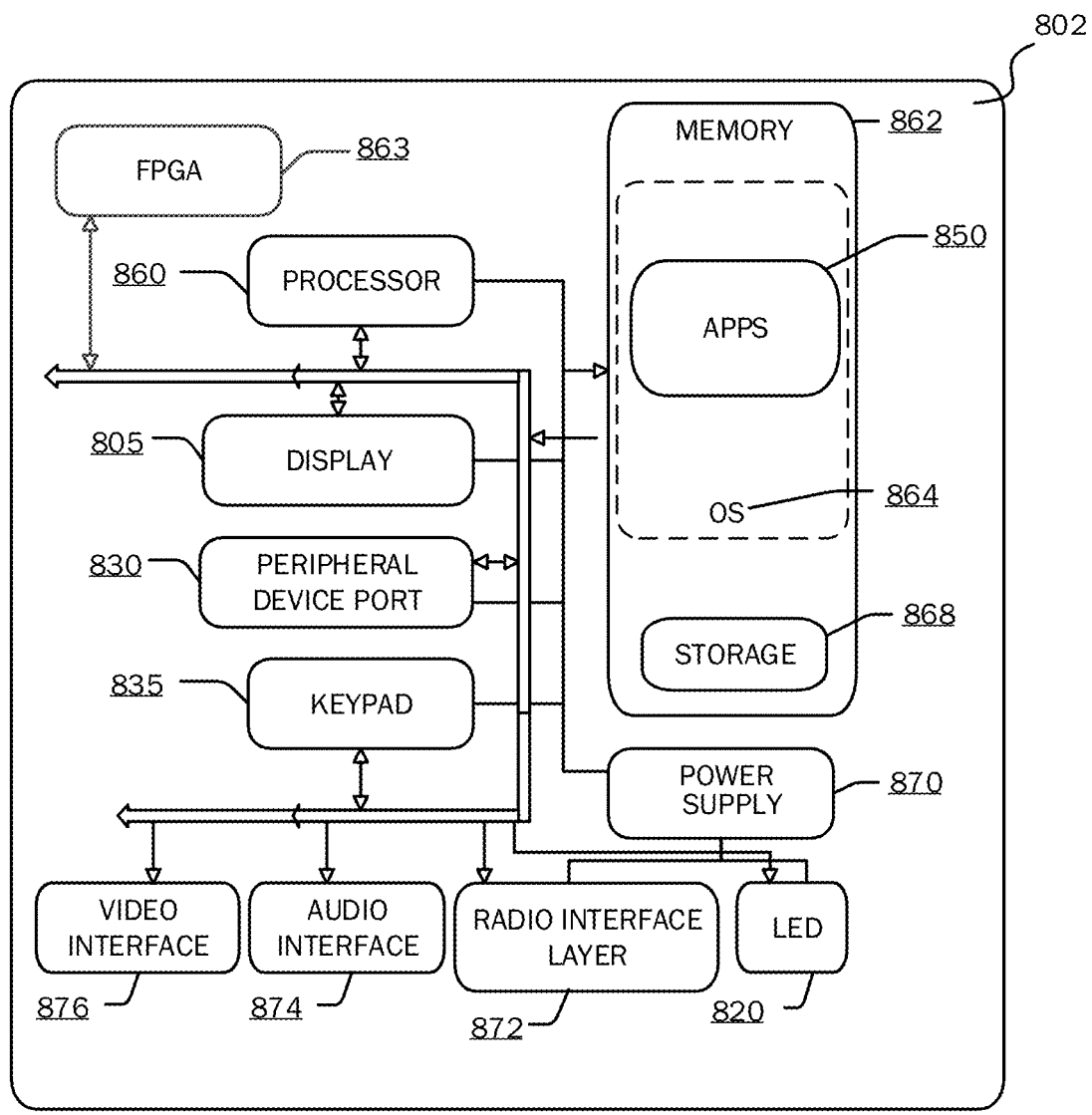

FIGS. 7, 8A, and 8B the associated descriptions provide a discussion of a variety of operating environments in which examples of the present technology may be practiced. However, the devices and systems illustrated and discussed with respect to FIGS. 7, 8A, and 8B are for purposes of example and illustration and are not limiting of a vast number of computing device configurations that may be utilized for practicing aspects of the invention, described herein.

FIG. 7 is a block diagram illustrating physical components (i.e., hardware) of a computing device 700 with which examples of the present disclosure may be practiced. The computing device components described below may be suitable for running a training process for a machine learning model or for performing inference using a trained machine learning model, as described above. In a basic configuration, the computing device 700 may include at least one processing unit 702, a field programmable gate array (FPGA) 703, and a system memory 704. In some embodiments, the processing unit 702 includes an FPGA 703 (e.g., the processing unit 702 may include an array of logic blocks that are reconfigurable through setting the interconnections). In some embodiments, the processing unit 702 is integrated or embedded into the FPGA 703 (e.g., in the case where one or more embedded "hard IP" CPU cores are connected directly to the interconnections or fabric of the FPGA 703 and/or one or more embedded "soft IP" CPU cores implemented using logic blocks of the FPGA 703). Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750 such as a machine learning model training application 752 or a client application 754. The operating system 705, for example, may be suitable for controlling the operation of the computing device 700. Furthermore, aspects of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes that offload computational tasks to the FPGA 703. The FPGA 703 may include data paths configured to accelerate the computation of various mathematical functions including, but not limited to, various embodiments of an approximation of the exponential function as described above with respect to FIGS. 1, 2, 3, 4A, and 4B, as well as the softmax function using one or more data paths implementing the exponential function on a vector of data (e.g., in a single instruction, multiple data or SIMD manner associated with a vector processor). The FPGA 703 may be configured to include other data paths for implementing other mathematical functions in accordance with examples of the present invention.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 7 may be integrated onto a single integrated circuit. Such an SOC device may include one or more processing units, field programmable gate arrays, graphics units, communications units, system virtualization units and various application functionality all of which are integrated (or "burned") onto the chip substrate as a single integrated circuit. When operating via an SOC, some functionality, described herein, with respect to training a machine learning model (e.g., a deep neural network) or performing a calculation involving the computation of an exponential function, may be operated via application-specific logic integrated with other components of the computing device 700 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. In cases where the computing device 700 is a server, such user input devices and user output devices are typically not present or not directly connected to the computing device 700. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, program modules, or configuration files ("bit files") specifying the configuration of an FPGA to implement particular functionality. The system memory 704, the removable storage device 709, and the non-removable storage device 710 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects of the invention may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In alternative examples, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 can incorporate a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone. As shown in FIG. 8B, the system 802 further includes a processor 860, a memory 862 storing an operating system 864 that may be executed by the processor 860. The system 802 may further include an FPGA 863, which may be configured (using a configuration file or bit file) to implement data paths for accelerating mathematical operations, such as exponential function data paths as described above according to various embodiments of the present disclosure.

One or more application programs 850 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, machine learning software (e.g., for retraining models and/or federated machine learning) and so forth. The system 802 also includes a non-volatile storage area 868 within the memory 862. The non-volatile storage area 868 may be used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

The visual indicator 820 may be used to provide visual notifications and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, one aspect of the technology relates to a field programmable gate array (FPGA) including a configurable interconnect fabric connecting a plurality of logic blocks, the configurable interconnect fabric and the logic blocks being configured to implement an exponential function data path including: an input scaling stage including a plurality of constant shifters and integer adders, implemented by the logic blocks and the configurable interconnect fabric, to scale a mantissa portion of an input floating-point value by a factor approximating $\log_2 e$ to compute a scaled mantissa value, where e is Euler's number; and an exponential stage including a plurality of barrel shifters and an exponential lookup table, implemented by the logic blocks and the configurable interconnect fabric, to: extract an integer portion from the scaled mantissa value based on an exponent portion of the input floating-point value; extract a fractional portion from the scaled mantissa value based on the exponent portion of the input floating-point value; apply a bias shift to the integer portion of the scaled mantissa value to compute a result exponent portion of a result floating-point value; lookup a result mantissa portion of the result floating-point value in the exponential lookup table based on the fractional portion of the scaled mantissa value; and combine the result exponent portion and the result mantissa portion to generate the result floating-point value, the result floating-point value representing an approximation of Euler's number e raised to the power of the input floating-point value.

The input scaling stage may be configured to scale the mantissa portion of the input floating-point value in accordance with a sum of a plurality of partial products, each partial product may be a product of a power of 2 and the mantissa portion of the input floating-point value, each partial product being implemented by a corresponding one of the constant shifters, and the sum of the partial products may be computed by the integer adders.

The constant shifters may be implemented by supplying the mantissa portion of the input floating-point value directly to inputs of the integer adders at offsets corresponding to bit shifts of the constant shifters.

The partial products may include products of the mantissa portion of the input floating-point value with $2^0$, $2^{-1}$, and $-2^{-4}$.

The integer adders may have widths that preserve all bits of the sum of the partial products.

The exponential lookup table may include mappings from the fractional portion of the scaled mantissa value representing a fractional value in a domain (−1,0] to Euler's number e raised to the power of the fractional value.

The fractional value may be truncated to AW most significant bits of the fractional portion of the scaled mantissa value, and the exponential lookup table may have $2^{AW}$ entries.

One aspect of the technology relates to computer storage media storing a configuration file, the configuration file specifying a configuration of a field programmable gate array (FPGA) including a configurable interconnect fabric and a plurality of logic blocks, where an FPGA configured based on the configuration file includes logic blocks, connected by the configurable interconnect fabric, implementing: an input scaling stage including a plurality of constant shifters and integer adders, implemented by the logic blocks and the configurable interconnect fabric, to scale a mantissa portion of an input floating-point value by a factor approximating $\log_2 e$ to compute a scaled mantissa value, where e is Euler's number; and an exponential stage including a plurality of barrel shifters and an exponential lookup table, implemented by the logic blocks and the configurable interconnect fabric, to: extract an integer portion from the scaled mantissa value based on an exponent portion of the input floating-point value; extract a fractional portion from the scaled mantissa value based on the exponent portion of the input floating-point value; apply a bias shift to the integer portion of the scaled mantissa value to compute a result exponent portion of a result floating-point value; lookup a result mantissa portion of the result floating-point value in the exponential lookup table based on the fractional portion of the scaled mantissa value; and combine the result exponent portion and the result mantissa portion to generate the result floating-point value, the result floating-point value representing an approximation of Euler's number e raised to the power of the input floating-point value.

The input scaling stage may be configured to scale the mantissa portion of the input floating-point value in accordance with a sum of a plurality of partial products, each partial product may be a product of a power of 2 and the mantissa portion of the input floating-point value, each partial product being implemented by a corresponding one of the constant shifters, and the sum of the partial products may be computed by the integer adders.

The configuration file may specify the constant shifters by specifying that the mantissa portion of the input floating-point value is directly connected to inputs of the integer adders at offsets corresponding to bit shifts of the constant shifters.

The partial products may include products of the mantissa portion of the input floating-point value with $2^0$, $2^{-1}$, and $-2^{-4}$.

The integer adders may have widths that preserve all bits of the sum of the partial products.

The exponential lookup table may include mappings from the fractional portion of the scaled mantissa value representing a fractional value in a domain (−1,0] to Euler's number e raised to the power of the fractional value.

The fractional value may be truncated to AW most significant bits of the fractional portion of the scaled mantissa value, and the exponential lookup table may have $2^{AW}$ entries.

One aspect of the technology relates to a method for implementing an exponential function in a field programmable gate array (FPGA) including a configurable interconnect fabric connecting a plurality of logic blocks, the method including: scaling, by an input scaling stage of the FPGA including a plurality of constant shifters and integer adders implemented by the configurable interconnect fabric and the plurality of logic blocks, a mantissa portion of an input floating-point value by a factor approximating $\log_2 e$ to compute a scaled mantissa value, where e is Euler's number; and computing, by an exponential stage including a plurality of barrel shifters and an exponential lookup table implemented by the configurable interconnect fabric and the plurality of logic blocks, an exponential based on the scaled mantissa value by: extracting an integer portion from the scaled mantissa value based on an exponent portion of the input floating-point value; extracting a fractional portion from the scaled mantissa value based on the exponent portion of the input floating-point value; applying a bias shift to the integer portion of the scaled mantissa value to compute a result exponent portion of a result floating-point value; looking up a result mantissa portion of the result floating-point value in the exponential lookup table based on the fractional portion of the scaled mantissa value; and combining the result exponent portion and the result mantissa portion to generate the result floating-point value, the result floating-point value representing an approximation of Euler's number e raised to the power of the input floating-point value.

The scaling the mantissa portion of the input floating-point value may be performed in accordance with a sum of a plurality of partial products, each partial product may be a product of a power of 2 and the mantissa portion of the input floating-point value, each partial product being implemented by a corresponding one of the constant shifters, the partial products may include products of the mantissa portion of the input floating-point value with $2^0$, $2^{-1}$, and $-2^{-4}$, and the sum of the partial products may be computed by the integer adders.

The partial products may be computed by supplying the mantissa portion of the input floating-point value directly to inputs of the integer adders at offsets corresponding to the powers of 2 corresponding to the partial products.

The integer adders may have widths that preserve all bits of the sum of the partial products.

The exponential lookup table may include mappings from the fractional portion of the scaled mantissa value representing a fractional value in a domain (−1,0] to Euler's number e raised to the power of the fractional value, the fractional value may be truncated to AW most significant bits of the fractional portion of the scaled mantissa value, and the exponential lookup table may have $2^{AW}$ entries.

The method may further include training a machine learning model, including: receiving, by a machine learning model training application executed by a computing device including a processor, memory, and the FPGA, labeled training data; supplying, by the machine learning model training application, the training data to the machine learning model to compute a plurality of K output scores; computing, by the input scaling stage and the exponential stage of the FPGA, a plurality of K exponentials corresponding to the K output scores; computing a K-way softmax over the K output scores based on the K exponentials to compute a plurality of normalized scores; updating the machine learning model based on the normalized scores; and outputting the updated machine learning model as a trained machine learning model.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A field programmable gate array (FPGA) comprising a configurable interconnect fabric connecting a plurality of logic blocks, the configurable interconnect fabric and the logic blocks being configured to implement an exponential function data path comprising:
an input scaling stage configured to scale a mantissa portion of an input floating-point value by a factor approximating $\log_2 e$ to compute a scaled mantissa value, where e is Euler's number, the input scaling stage comprising a plurality of constant shifters and a plurality of integer adders connected to a plurality of outputs of the constant shifters, implemented by the logic blocks and the configurable interconnect fabric, without a multiplier circuit,
wherein the plurality of constant shifters compute a plurality of partial products of a power of 2 and the mantissa portion of the input floating-point value, and
wherein the plurality of integer adders add the plurality of partial products and the mantissa portion of the input floating point value to compute the scaled mantissa value; and
an exponential stage comprising a plurality of barrel shifters and an exponential lookup table, implemented by the logic blocks and the configurable interconnect fabric, to:
extract an integer portion from the scaled mantissa value based on an exponent portion of the input floating-point value;
extract a fractional portion from the scaled mantissa value based on the exponent portion of the input floating-point value;
apply a bias shift to the integer portion of the scaled mantissa value to compute a result exponent portion of a result floating-point value;
lookup a result mantissa portion of the result floating-point value in the exponential lookup table based on the fractional portion of the scaled mantissa value; and
combine the result exponent portion and the result mantissa portion to generate the result floating-point value, the result floating-point value representing an approximation of Euler's number e raised to the power of the input floating-point value.

2. The FPGA of claim 1, wherein the constant shifters are implemented by supplying the mantissa portion of the input floating-point value directly to inputs of the integer adders at offsets corresponding to bit shifts of the constant shifters.

3. The FPGA of claim 1, wherein the partial products comprise products of the mantissa portion of the input floating-point value with $2^0$, $2^{-1}$, and $-2^{-4}$.

4. The FPGA of claim 1, wherein the integer adders have widths that preserve all bits of the sum of the partial products.

5. The FPGA of claim 1, wherein the exponential lookup table comprises mappings from the fractional portion of the scaled mantissa value representing a fractional value in a domain (−1,0] to Euler's number e raised to the power of the fractional value.

6. The FPGA of claim 5, wherein the fractional value is truncated to AW most significant bits of the fractional portion of the scaled mantissa value, and
wherein the exponential lookup table has $2^{AW}$ entries.

7. Non-transitory computer storage media storing a configuration file, the configuration file specifying a configuration of a field programmable gate array (FPGA) comprising a configurable interconnect fabric and a plurality of logic blocks, where an FPGA configured based on the configuration file comprises logic blocks, connected by the configurable interconnect fabric, implementing:
an input scaling stage configured to scale a mantissa portion of an input floating-point value by a factor approximating $\log_2 e$ to compute a scaled mantissa value, where e is Euler's number, the input scaling stage comprising a plurality of constant shifters and a plurality of integer adders connected to a plurality of outputs of the constant shifters, implemented by the logic blocks and the configurable interconnect fabric, without a multiplier circuit, wherein the plurality of constant shifters compute a plurality of partial products of a power of 2 and the mantissa portion of the input floating-point value, and wherein the plurality of integer adders add the plurality of partial products and the mantissa portion of the input floating point value to compute the scaled mantissa value; and an exponential stage comprising a plurality of barrel shifters and an exponential lookup table, implemented by the logic blocks and the configurable interconnect fabric, to:

extract an integer portion from the scaled mantissa value based on an exponent portion of the input floating-point value;

extract a fractional portion from the scaled mantissa value based on the exponent portion of the input floating-point value;

apply a bias shift to the integer portion of the scaled mantissa value to compute a result exponent portion of a result floating-point value;

lookup a result mantissa portion of the result floating-point value in the exponential lookup table based on the fractional portion of the scaled mantissa value; and combine the result exponent portion and the result mantissa portion to generate the result floating-point value, the result floating-point value representing an approximation of Euler's number e raised to the power of the input floating-point value.

8. The non-transitory computer storage media of claim 1, wherein the configuration file specifies the constant shifters by specifying that the mantissa portion of the input floating-point value is directly connected to inputs of the integer adders at offsets corresponding to bit shifts of the constant shifters.

9. The non-transitory computer storage media of claim 1, wherein the partial products comprise products of the mantissa portion of the input floating-point value with $2^0$, $2^{-1}$, and $-2^{-4}$.

10. The non-transitory computer storage media of claim 1, wherein the integer adders have widths that preserve all bits of the sum of the partial products.

11. The non-transitory computer storage media of claim 1, wherein the exponential lookup table comprises mappings from the fractional portion of the scaled mantissa value representing a fractional value in a domain (−1,0] to Euler's number e raised to the power of the fractional value.

12. The non-transitory computer storage media of claim 11, wherein the fractional value is truncated to AW most significant bits of the fractional portion of the scaled mantissa value, and wherein the exponential lookup table has $2^{AW}$ entries.

13. A method for implementing an exponential function in a field programmable gate array (FPGA) comprising a configurable interconnect fabric connecting a plurality of logic blocks, the method comprising:

scaling a mantissa portion of an input floating-point value by a factor approximating $\log_2 e$ to compute a scaled mantissa value, where e is Euler's number, by an input scaling stage of the FPGA comprising a plurality of constant shifters and a plurality of integer adders connected to a plurality of outputs of the constant shifters, implemented by the configurable interconnect fabric and the plurality of logic blocks, without a multiplier circuit, wherein the plurality of constant shifters compute a plurality of partial products of a power of 2 and the mantissa portion of the input floating-point value, and wherein the plurality of integer adders add the plurality of partial products and the mantissa portion of the input floating point value to compute the scaled mantissa value; and computing, by an exponential stage comprising a plurality of barrel shifters and an exponential lookup table implemented by the configurable interconnect fabric and the plurality of logic blocks, an exponential based on the scaled mantissa value by:

extracting an integer portion from the scaled mantissa value based on an exponent portion of the input floating-point value;

extracting a fractional portion from the scaled mantissa value based on the exponent portion of the input floating-point value;

applying a bias shift to the integer portion of the scaled mantissa value to compute a result exponent portion of a result floating-point value;

looking up a result mantissa portion of the result floating-point value in the exponential lookup table based on the fractional portion of the scaled mantissa value; and combining the result exponent portion and the result mantissa portion to generate the result floating-point value, the result floating-point value representing an approximation of Euler's number e raised to the power of the input floating-point value.

14. The method of claim 13, wherein the partial products comprise products of the mantissa portion of the input floating-point value with $2^0$, $2^{-1}$, and $-2^{-4}$.

15. The method of claim 14, wherein the partial products are computed by supplying the mantissa portion of the input floating-point value directly to inputs of the integer adders at offsets corresponding to the powers of 2 corresponding to the partial products.

16. The method of claim 14, wherein the integer adders have widths that preserve all bits of the sum of the partial products.

17. The method of claim 13, wherein the exponential lookup table comprises mappings from the fractional portion of the scaled mantissa value representing a fractional value in a domain (−1,0] to Euler's number e raised to the power of the fractional value, wherein the fractional value is truncated to AW most significant bits of the fractional portion of the scaled mantissa value, and wherein the exponential lookup table has $2^{AW}$ entries.

18. The method of claim 13, further comprising training a machine learning model, comprising:

receiving, by a machine learning model training application executed by a computing device comprising a processor, memory, and the FPGA, labeled training data;

supplying, by the machine learning model training application, the training data to the machine learning model to compute a plurality of K output scores;

computing, by the input scaling stage and the exponential stage of the FPGA, a plurality of K exponentials corresponding to the K output scores;

computing a K-way softmax over the K output scores based on the K exponentials to compute a plurality of normalized scores;

updating the machine learning model based on the normalized scores; and outputting the updated machine learning model as a trained machine learning model.

* * * * *